United States Patent
Dimitrakopoulos et al.

(10) Patent No.: US 11,655,635 B2
(45) Date of Patent: *May 23, 2023

(54) PLASTER BOARDS HAVING INTERNAL LAYERS AND METHODS FOR MAKING THEM

(71) Applicant: CertainTeed Gypsum, Inc., Malvern, PA (US)

(72) Inventors: James Dimitrakopoulos, Conshohocken, PA (US); Vincent Infante, Malvern, PA (US); John Bridenstine, Dade City, FL (US); David William Pugh, Berwyn, PA (US); David Hagelgans, Lancaster, PA (US); Ying Wang, Westborough, MA (US); Xuejuan Xu, Northborough, MA (US)

(73) Assignee: CertainTeed Gypsum, Inc., Malvern, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/308,028

(22) Filed: May 4, 2021

(65) Prior Publication Data

US 2021/0324628 A1 Oct. 21, 2021

Related U.S. Application Data

(63) Continuation of application No. 16/143,084, filed on Sep. 26, 2018, now Pat. No. 11,124,965.
(Continued)

(51) Int. Cl.
*E04C 2/04* (2006.01)
*B32B 3/10* (2006.01)
(Continued)

(52) U.S. Cl.
CPC .............. *E04C 2/043* (2013.01); *B26F 3/002* (2013.01); *B32B 3/26* (2013.01); *B32B 3/263* (2013.01);
(Continued)

(58) Field of Classification Search
None
See application file for complete search history.

(56) References Cited

U.S. PATENT DOCUMENTS 1,798,609 A 3/1931 Knowlton
2,310,217 A 2/1943 Crandell
(Continued)

FOREIGN PATENT DOCUMENTS

AU 2007100101 B4 3/2007
CN 103291035 A 9/2013
(Continued)

OTHER PUBLICATIONS

Machine Translation of JP-2504024-Y2, Jul. 1996 (Year: 1996).*
(Continued)

*Primary Examiner* — Jeffrey A Vonch
(74) *Attorney, Agent, or Firm* — McDonnell Boehnen Hulbert & Berghoff LLP

(57) ABSTRACT

Disclosed herein are plaster boards that include first and second layers of hardened plaster material, a liner attached to the first layer of hardened plaster material, and a first material (e.g., a polymer material such as a viscoelastic polymer) adhered between the liner and the second layer of hardened plaster material. The liner includes one or more structurally weakened regions each extending substantially from a first edge to a second opposing edge of the plaster board. The structurally weakened regions of the liner may facilitate creation of a fissure that propagates substantially within a plane within the plaster board. Methods for making
(Continued)

the plaster boards may involve drying wet plaster material while it is in contact with a liner having structurally weakened regions, processing a liner to form its structurally weakened regions while in contact with wet plaster material, or processing a liner to form its structurally weakened regions while in contact with hardened plaster material.

20 Claims, 20 Drawing Sheets

Related U.S. Application Data

(60) Provisional application No. 62/563,118, filed on Sep. 26, 2017.

(51) Int. Cl.
*B32B 3/24* (2006.01)
*B32B 3/26* (2006.01)
*B32B 7/12* (2006.01)
*B32B 13/04* (2006.01)
*E04B 1/84* (2006.01)
*E04B 1/86* (2006.01)
*B26F 3/00* (2006.01)
*B32B 37/12* (2006.01)
*B32B 38/04* (2006.01)
*B32B 13/08* (2006.01)
*B32B 13/12* (2006.01)
*B32B 13/14* (2006.01)
*E04C 2/288* (2006.01)
*E04B 2/74* (2006.01)
*B26D 3/08* (2006.01)
*B28B 11/14* (2006.01)

(52) U.S. Cl.
CPC ............... *B32B 3/266* (2013.01); *B32B 7/12* (2013.01); *B32B 13/04* (2013.01); *B32B 37/12* (2013.01); *B32B 38/04* (2013.01); *E04B 1/84* (2013.01); *E04B 1/86* (2013.01); *B26D 3/085* (2013.01); *B28B 11/14* (2013.01); *B32B 13/045* (2013.01); *B32B 13/12* (2013.01); *B32B 13/14* (2013.01); *B32B 2038/042* (2013.01); *B32B 2038/045* (2013.01); *B32B 2038/047* (2013.01); *B32B 2250/40* (2013.01); *B32B 2307/102* (2013.01); *B32B 2307/51* (2013.01); *B32B 2307/56* (2013.01); *B32B 2307/58* (2013.01); *B32B 2307/582* (2013.01); *B32B 2607/00* (2013.01); *E04B 1/8409* (2013.01); *E04B 2/7409* (2013.01); *E04B 2001/8461* (2013.01); *E04C 2/2885* (2013.01); *Y10T 156/1051* (2015.01); *Y10T 156/1062* (2015.01); *Y10T 156/1064* (2015.01); *Y10T 428/15* (2015.01); *Y10T 428/24322* (2015.01); *Y10T 428/24331* (2015.01); *Y10T 428/24339* (2015.01); *Y10T 428/24612* (2015.01)

(56) References Cited

U.S. PATENT DOCUMENTS

| | | |
|---|---|---|
| 2,811,906 A | 11/1957 | Chappell |
| 3,047,447 A | 7/1962 | Stasse |
| 3,160,549 A | 12/1964 | Caldwell et al. |
| 3,215,225 A | 11/1965 | Kirschner |
| 3,336,710 A | 8/1967 | Raynes |
| 3,399,104 A | 8/1968 | Ball, III et al. |
| 3,424,270 A | 1/1969 | Hartman et al. |
| 3,462,899 A | 8/1969 | Sherman |
| 3,513,009 A | 5/1970 | Austin et al. |
| 3,579,941 A | 5/1971 | Tibbals |
| 3,642,511 A | 2/1972 | Cohn et al. |
| 3,786,603 A | 1/1974 | Kasprzak |
| 3,828,504 A | 8/1974 | Egerborg et al. |
| 3,944,698 A | 3/1976 | Dierks |
| 3,960,580 A | 6/1976 | Stierli et al. |
| 4,003,752 A | 1/1977 | Osohata et al. |
| RE29,157 E | 3/1977 | Petersen et al. |
| 4,112,176 A | 9/1978 | Bailey |
| 4,134,956 A | 1/1979 | Suzuki et al. |
| 4,156,615 A | 5/1979 | Cukier et al. |
| 4,174,229 A | 11/1979 | Boberski et al. |
| 4,347,912 A | 9/1982 | Flocke et al. |
| 4,375,516 A | 3/1983 | Barrall |
| 4,474,840 A | 10/1984 | Adams |
| 4,487,793 A | 12/1984 | Haines et al. |
| 4,557,970 A | 12/1985 | Holtrop et al. |
| 4,618,370 A | 10/1986 | Green et al. |
| 4,642,951 A | 2/1987 | Mortimer |
| 4,663,224 A | 5/1987 | Tabata et al. |
| 4,678,515 A | 7/1987 | Green et al. |
| 4,685,259 A | 8/1987 | Eberhart et al. |
| 4,759,164 A | 7/1988 | Abendroth et al. |
| 4,778,028 A | 10/1988 | Staley |
| 4,786,543 A | 11/1988 | Ferm |
| 4,858,402 A | 8/1989 | Putz |
| 4,924,969 A | 5/1990 | K ' Heureux |
| 4,956,321 A | 9/1990 | Barrall |
| 4,967,530 A | 11/1990 | Clunn |
| 5,016,413 A | 5/1991 | Counihan |
| 5,026,593 A | 6/1991 | O'Brien |
| 5,033,247 A | 7/1991 | Clunn |
| 5,063,098 A | 11/1991 | Niwa et al. |
| 5,085,929 A | 2/1992 | Bruce |
| 5,104,715 A | 4/1992 | Cruz |
| 5,110,660 A | 5/1992 | Wolf et al. |
| 5,116,671 A | 5/1992 | Bruce |
| 5,125,475 A | 6/1992 | Duchame et al. |
| 5,158,612 A | 10/1992 | Savoly et al. |
| 5,240,639 A | 8/1993 | Diez et al. |
| 5,256,223 A | 10/1993 | Alberts et al. |
| 5,258,585 A | 11/1993 | Juriga |
| 5,334,806 A | 8/1994 | Avery |
| 5,342,465 A | 8/1994 | Bronowicki et al. |
| 5,368,914 A | 11/1994 | Barrett |
| 5,439,735 A | 8/1995 | Jamison |
| 5,473,122 A | 12/1995 | Kodiyalam et al. |
| 5,502,931 A | 4/1996 | Munir |
| 5,601,888 A | 2/1997 | Fowler |
| 5,603,192 A | 2/1997 | Dickson |
| 5,629,503 A | 5/1997 | Thomasen |
| 5,643,666 A | 7/1997 | Eckart et al. |
| 5,664,397 A | 9/1997 | Holz |
| 5,691,037 A | 11/1997 | McCutcheon et al. |
| 5,695,867 A | 12/1997 | Saitoh et al. |
| 5,768,841 A | 6/1998 | Swartz et al. |
| 5,824,973 A | 10/1998 | Haines et al. |
| 5,842,686 A | 12/1998 | Hansen |
| 5,867,957 A | 2/1999 | Holtrop |
| 5,910,082 A | 6/1999 | Bender et al. |
| 5,945,208 A | 8/1999 | Richards et al. |
| 5,954,497 A | 9/1999 | Cloud et al. |
| 6,077,613 A | 6/2000 | Gaffigan |
| 6,115,926 A | 9/2000 | Robell |
| 6,123,171 A | 9/2000 | McNett et al. |
| 6,133,172 A | 10/2000 | Sevenish et al. |
| 6,213,252 B1 | 4/2001 | Ducharme |
| 6,240,704 B1 | 6/2001 | Porter |
| 6,266,427 B1 | 7/2001 | Mathur |
| 6,286,280 B1 | 9/2001 | Fahmy et al. |
| 6,290,021 B1 | 9/2001 | Standgaard |
| 6,309,985 B1 | 10/2001 | Virnelson et al. |
| 6,319,312 B1 | 11/2001 | Luongo |
| 6,342,284 B1 | 1/2002 | Yu |
| 6,381,196 B1 | 4/2002 | Hein et al. |
| 6,389,771 B1 | 5/2002 | Moller |
| 6,391,958 B1 | 5/2002 | Luongo |
| 6,443,256 B1 | 9/2002 | Baig |
| 6,539,643 B1 | 4/2003 | Gleeson |

(56) References Cited

U.S. PATENT DOCUMENTS

| | | | |
|---|---|---|---|
| 6,562,444 B1 | 5/2003 | Gleeson | |
| 6,632,550 B1 | 10/2003 | Yu | |
| 6,676,744 B2 | 1/2004 | Merkley et al. | |
| 6,699,426 B1 | 3/2004 | Burke | |
| 6,715,241 B2 | 4/2004 | Gelin et al. | |
| 6,758,305 B2 | 7/2004 | Gelin et al. | |
| 6,760,978 B2 | 7/2004 | Gleeson | |
| 6,790,520 B1 | 9/2004 | Todd et al. | |
| 6,800,161 B2 | 10/2004 | Takigawa | |
| 6,803,110 B2 | 10/2004 | Drees et al. | |
| 6,815,049 B2 | 11/2004 | Veramasuneni | |
| 6,822,033 B2 | 11/2004 | Yu | |
| 6,825,137 B2 | 11/2004 | Fu et al. | |
| 6,877,585 B2 | 4/2005 | Tinianov | |
| 6,913,667 B2 | 7/2005 | Nudo et al. | |
| 6,920,723 B2 | 7/2005 | Downey | |
| 6,941,720 B2 | 9/2005 | Deford et al. | |
| 7,041,377 B2 | 5/2006 | Miura et al. | |
| 7,068,033 B2 | 6/2006 | Sellers et al. | |
| 7,181,891 B2 | 2/2007 | Surace et al. | |
| 7,197,855 B2 | 4/2007 | Della Pepa | |
| 7,255,907 B2 | 8/2007 | Feigin et al. | |
| 7,745,005 B2 | 6/2010 | Tinianov | |
| 7,799,410 B2 | 9/2010 | Tinianov | |
| 7,883,763 B2 | 2/2011 | Tinianov | |
| 8,424,251 B1 | 4/2013 | Tinianov | |
| 9,390,700 B1 | 7/2016 | Pham | |
| 10,174,499 B1 | 1/2019 | Tinianov | |
| 2004/0016184 A1 | 1/2004 | Huebsch | |
| 2004/0168853 A1 | 9/2004 | Gunasekera | |
| 2004/0214008 A1 | 10/2004 | Dobrusky | |
| 2004/0224584 A1 | 11/2004 | Broadway | |
| 2005/0103568 A1 | 5/2005 | Sapoval | |
| 2005/0130541 A1 | 6/2005 | Shah | |
| 2005/0263925 A1 | 12/2005 | Heseltine | |
| 2005/0266225 A1 | 12/2005 | Currier | |
| 2006/0045975 A1 | 3/2006 | Yamaji | |
| 2006/0048682 A1 | 3/2006 | Wagh | |
| 2006/0057345 A1 | 3/2006 | Surace | |
| 2006/0059806 A1 | 3/2006 | Gosling | |
| 2006/0108175 A1 | 5/2006 | Surace | |
| 2006/0111574 A1 | 6/2006 | Martin | |
| 2007/0023118 A1 | 2/2007 | Spielvogel | |
| 2007/0094950 A1 | 5/2007 | Surace | |
| 2007/0107350 A1 | 5/2007 | Surace | |
| 2007/0220824 A1 | 9/2007 | Hasegawa | |
| 2008/0050562 A1 | 2/2008 | Braun | |
| 2008/0086957 A1 | 4/2008 | Averill | |
| 2008/0245603 A1 | 10/2008 | Tinianov | |
| 2008/0251198 A1 | 10/2008 | Tinianov | |
| 2008/0261041 A1 | 10/2008 | Thomas | |
| 2008/0264721 A1 | 10/2008 | Tinianov | |
| 2009/0004448 A1 | 1/2009 | Tinianov | |
| 2009/0022962 A1 | 1/2009 | Ruokolainen | |
| 2010/0018133 A1 | 1/2010 | Boyadjian | |
| 2010/0048372 A1 | 2/2010 | Okazaki | |
| 2010/0255243 A1 | 10/2010 | Geeraert | |
| 2011/0061234 A1 | 3/2011 | Tinianov | |
| 2011/0061324 A1 | 3/2011 | Tinianov | |
| 2011/0165429 A1 | 7/2011 | Tinianov | |
| 2011/0296794 A1 | 12/2011 | Thomas | |
| 2012/0073899 A1 | 3/2012 | Fournier | |
| 2012/0090183 A1 | 4/2012 | Cadden | |
| 2012/0295059 A1 | 11/2012 | Frank | |
| 2013/0087409 A1 | 4/2013 | Payot | |
| 2013/0118831 A1 | 5/2013 | Kawai | |
| 2013/0186705 A1 | 7/2013 | Payot | |
| 2013/0234373 A1 | 9/2013 | Zuardy | |
| 2013/0240291 A1 | 9/2013 | Tinianov | |
| 2014/0273687 A1 | 9/2014 | Garvey | |
| 2014/0329060 A1 | 11/2014 | Vivier | |
| 2015/0218804 A1 | 8/2015 | Payot | |
| 2016/0153187 A1 | 6/2016 | Desai | |
| 2016/0230384 A1 | 8/2016 | Blades | |
| 2017/0037617 A1 | 2/2017 | Blades | |
| 2017/0037637 A1 | 2/2017 | Grisolia | |
| 2017/0081843 A1 | 3/2017 | Berneth | |
| 2017/0144324 A1 | 5/2017 | Thiabault | |
| 2018/0030741 A1 | 2/2018 | Cruickshank | |
| 2018/0171626 A1 | 6/2018 | Shi | |

FOREIGN PATENT DOCUMENTS

| | | | |
|---|---|---|---|
| CN | 106476367 A | | 3/2017 |
| JP | S55-035223 U | | 3/1980 |
| JP | S55-113408 U | | 8/1980 |
| JP | H08-34013 A | | 2/1996 |
| JP | 2504024 Y2 | * | 7/1996 |
| JP | H09203153 A | | 8/1997 |
| JP | 3066741 U | | 3/2000 |
| JP | 3066741 U | * | 3/2000 |
| JP | 2004-042557 A | | 2/2004 |
| KR | 20140113068 A | | 9/2014 |
| WO | 9001090 A1 | | 2/1990 |
| WO | 1996034261 A1 | | 10/1996 |
| WO | 1997019033 A1 | | 5/1997 |
| WO | 2000024690 A1 | | 5/2000 |
| WO | 2017108146 A1 | | 6/2017 |
| WO | 2019123909 A1 | | 6/2019 |

OTHER PUBLICATIONS

Machine Translation of JP-3066741-U, Mar. 2000 (Year: 2000).*
Lippiatt, B.C., National Institute of Standards and Technology. BEES 3.0, "Building for Environmental and Economic Sustainability Technical Manual and User Guide", Oct. 2002, (198 pages).
CertainTeed, "QuietRock 510 Installation Instructions", Jul. 2010, (date accessed Aug. 13, 2014), https://www.certainteed.com/resources/CTG_2823_QR510_Installation_E.pdf. *
Noise Killer: Pro Damping Compound Materials http://www.tnt-audio.com/clinica/noise.html May 18, 2007,1998 (3 pages).
Non-Final Office Action dated May 3, 2013 from U.S. Appl. No. 11/697,691, 14 pages.
Patent Examination Report No. 1 dated Apr. 24, 2013, from Australian Application No. 2008237205, 5 pages.
Marty, R. "Data support use of P-Cell in diabetic footwear", CMP Media LLC, Mar. 1, 2003.
Transmission Loss of Leaded Building Materials, Pail B. Ostergaard, Richmond L. Cardinell, and Lewis S. Goodfriend, The Journal of the Acoustical Society of America, vol. 35, No. 6, Jun. 1963.
Unified Facilities Criteria (UFC) Noise and Vibration Control, UFC 3-450-01. May 15, 2003, Department of Defense.
Wood Handbook/Wood as an Engineering Material, United States Department of Agriculture, Forest Service, General Technical Report FPL-FGTR-113, Mar. 1999.
ASC WallDamp materials from Acoustic Sciences Corporation https://web.archive.org/web/20021013031149/http://www.asc-soundproof.com/index-walldamp.htm, archive date 2002 (accessed May 3, 2021) 11 pages.
ADM Technologies, USA, Dynamic Control http://web.archive.org/web/20010518083911/www.admteschusa.com:80/, archive date 2002 (accessed May 3, 2021) 21 pages.
Nordisk Akustik A/S materials, LDL for sandwhich-construktions, http://web.archive.org/web/20020624093372 4/www.nordisk-akustik.dk/html_uk/prod03.html, archive date Jun. 24, 2002 (accessed May 3, 2021) 2 pages.
Noxon, A.M. "The Chain is as Strong as Its Weakest Link" Acoustic Sciences Corporation. http://www.art-noxon.com/articles/chain.htm Copyright 2009 (accessed May 3, 2021). 8 pages.
Sharp, B.H. "A Study of Techniques to Increase the Sound Insulation of Building Elements" Prepared for the Department of Housing and Urban Development, Washington, D.C. Jun. 1973.
Copending U.S. Appl. No. 15/844,088, filed Dec. 2017 (published as US20180171616A1).
International Search Report and Written Opinion in International Patent Application No. PCT/US2018/052943, dated Mar. 22, 2019.

(56) References Cited

OTHER PUBLICATIONS

Copending U.S. Appl. No. 16/143,084, filed Sep. 26, 2018 (published as US20190093354A1).

* cited by examiner

PLASTER BOARDS HAVING INTERNAL LAYERS AND METHODS FOR MAKING THEM

CROSS-REFERENCE TO RELATED APPLICATIONS

This application claims the benefit of priority of U.S. Provisional Patent Application No. 62/563,118. filed Sep. 26, 2017, which is hereby incorporated herein by reference in its entirety.

BACKGROUND OF THE DISCLOSURE

1. Field of the Disclosure

The present disclosure relates generally to plaster boards having internal layers (i.e., between layers of plaster) and methods for making them. The present disclosure relates more particularly to plaster boards having an interior liner with one or more structurally weakened regions that may facilitate creation of a fissure that propagates within the plaster board to form the plaster board into desirable shapes and sizes.

2. Technical Background

Plaster boards, also known as "drywall boards," are typically used to construct walls within homes, businesses, or other buildings. Plaster boards are very often made of gypsum, but other materials, including lime and cement, are also used. A typical method for making a plaster board involves dispensing and spreading a wet plaster material (e.g., a slurry of gypsum in water) onto a paper or fiberglass liner on a platform, and covering the plaster material with another paper or fiberglass liner. This sandwiched structure is fed through extruder plates to provide a structure of a desired thickness and allowed to cure to form a hardened plaster material disposed between the two liners of paper or fiberglass. The plaster board may be cut into sections having predetermined lengths and widths that conform to accepted construction standards.

Soundproofing is becoming an ever-increasing concern for the construction industry, for example, for use in residences, hotels, schools, and hospitals. Soundproofing is also desirable in the construction of theaters and music studios, to insulate noise made in those areas from surrounding rooms. Model building codes and design guidelines often specify minimum Sound Transmission Class values for wall structures within buildings. While a number of construction techniques have been used to address the problem of soundproofing, one especially desirable technique uses sound-damping plaster boards that can be used in place of conventional plaster boards in various residential or commercial structures.

A sound-damping plaster board typically includes a damping layer having viscoelastic properties disposed between first and second layers of hardened plaster material. In some cases, the damping layer may be disposed between respective paper or fiberglass liners adhered to the first and second layers of hardened plaster material. The damping layer is typically more efficient at sound damping than the layers of hardened plaster material on either side of the damping layer. And other types of plaster boards can have other types of internal layers to provide for other functionalities.

It is generally advantageous for any type of plaster board to have properties that allow it to be easily "scored" and "snapped" into different shapes and sizes that accommodate particular characteristics of the space into which the plaster board is to be installed. However, the damping layer and/or liners of some sound damping plaster boards can prevent substantially planar propagation of a fissure through the plaster board as may be desired to form the plaster board into desirable shapes and sizes. For example, an installer may score and snap a plaster board, causing a fissure to propagate substantially within an interior plane of the first layer of hardened plaster material. The propagation of the fissure may be interrupted by the respective liners attached to the first or second layers of hardened plaster material, however. More specifically, the discontinuity formed by the liners may cause a fissure propagating through the first layer of hardened plaster material to "jump" to a different lateral location within the second layer of hardened plaster material on the other side of the liners. In another example, the liners may cause the fissure to not propagate into the second layer of hardened plaster material at all. One solution involves abrasively removing one or both liners prior to the first and second layers of hardened plaster material being adhered to each other via the damping layer, but this step undesirably lengthens processing time and also provides additional opportunity for the plaster board to be damaged before it is completely formed.

Accordingly, what is needed are plaster boards having an interior material layer that are easier to manufacture and/or easier to modify in the field (e.g., at construction sites).

SUMMARY OF THE DISCLOSURE

One aspect of the disclosure includes a plaster board having a first edge and a second opposing edge. The plaster board includes a first layer of hardened plaster material having a first surface and an opposed second surface, and a first liner that is attached to the first surface of the first layer of hardened plaster material. The first liner includes one or more structurally weakened regions, each of the structurally weakened regions extending substantially from the first edge to the second edge of the plaster board. The plaster board also includes a second layer of hardened plaster material including a first surface and an opposed second surface, and a layer of a first material (e.g., a polymer material) adhered between the first liner and the first surface of the second layer of hardened plaster material.

Another aspect of the disclosure includes a method for making a plaster board, the plaster board having a first edge and a second opposing edge. The method includes providing a first plaster board blank having a first layer of hardened plaster material having a first surface, and a first liner attached to the first surface of the first layer of hardened plaster material. The first liner includes one or more structurally weakened regions, each of the structurally weakened regions extending substantially from the first edge to the second edge of the plaster board. The method also includes providing a second plaster board blank having a second layer of hardened plaster material having a first surface and adhering a first material (e.g., a polymer material) between the first liner and the first surface of the second layer of hardened plaster material.

Another aspect of the disclosure includes a method of forming a fissure in a plaster board. The method includes scoring the first layer of hardened plaster material on its second surface along a line that passes over one or more of the one or more structurally weakened regions of the first liner or one or more of the one or more structurally weakened regions of the second liner; and snapping the plaster board across the scored line, the snapping being performed such that the first liner and/or the second liner is separated along a substantially linear perforation.

Another aspect of the disclosure includes a method of forming a fissure in a plaster board. The method includes scoring the second layer of hardened plaster material on its second surface along a line that passes over one or more of the one or more structurally weakened regions of the first liner or one or more of the one or more structurally weakened regions of the second liner; and snapping the plaster board across the scored line, the snapping being performed such that the first liner and/or the second liner is separated along a substantially linear perforation.

Additional aspects of the disclosure will be evident from the disclosure herein.

BRIEF DESCRIPTION OF THE DRAWINGS

The accompanying drawings are included to provide a further understanding of the methods and devices of the disclosure, and are incorporated in and constitute a part of this specification. The drawings are not necessarily to scale, and sizes of various elements may be distorted for clarity. The drawings illustrate one or more embodiment(s) of the disclosure, and together with the description serve to explain the principles and operation of the disclosure.

DETAILED DESCRIPTION

Figure 1:
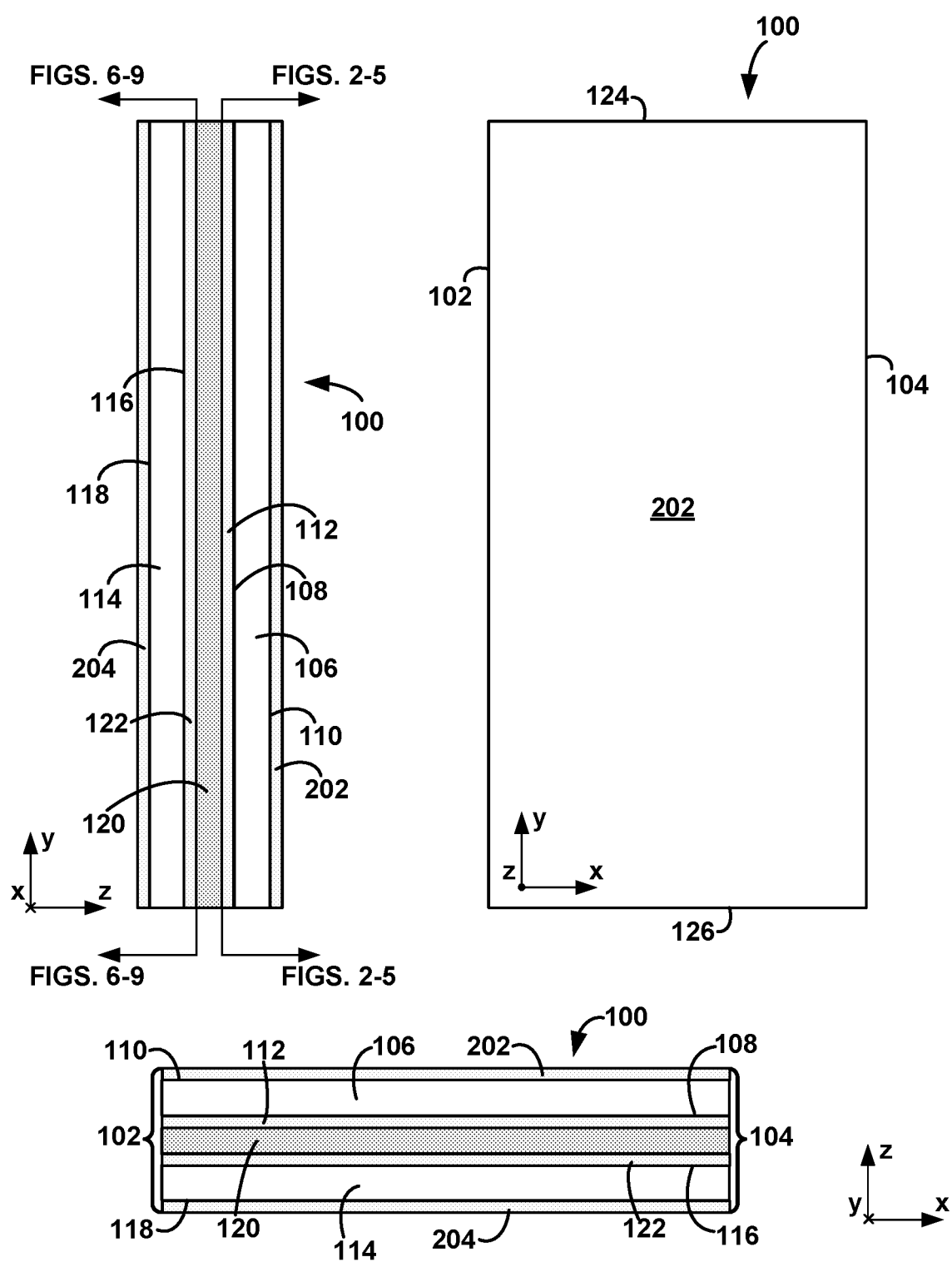
FIG. 1 is a set of three schematic views of a plaster board according to one embodiment of the disclosure.

As noted above, the present inventors have noted disadvantages of existing plaster boards having internal layers (e.g., internal polymer layers and other internal functional layers) and methods for making them. Accordingly, one aspect of the disclosure is a plaster board having a first edge and a second opposing edge. The plaster board includes a first layer of hardened plaster material having a first surface and an opposed second surface, and a first liner (e.g., paper, fiberglass, plastic, thermoplastic, or paper/fiberglass composite) that is attached to the first surface of the first layer of hardened plaster material. The first liner includes one or more structurally weakened regions that extend substantially from the first edge to the second edge of the plaster board. The plaster board further includes a second layer of hardened plaster material including a first surface and an opposed second surface, and a first material (e.g., a first polymer material) adhered between the first liner and the first surface of the second layer of hardened plaster material.

The present inventors have determined that the use of structurally weakened regions as described herein can allow an interior liner to be more easily broken when the whole board is broken, e.g., by a score-and-snap method conventional in the art. As used herein, a structurally weakened region can take many forms. For example, it can take the form of one or more holes, perforations, scores, cuts, or indentations (i.e., partial perforations) formed in the material of the liner. Structurally weakened regions need not go through the entire thickness of a liner; as the person of ordinary skill in the art will appreciate, an indentation can cause significant weakening (e.g., when it is at least 0.001 inches deep, e.g., at least 0.005 inches deep, or at least 0.01 inches deep, or in the range of 0.001-0.012 inches deep, or in the range of 0.005 inches to 0.012 inches deep, or in the range of 0.01 inches to 0.02 inches deep, substantially equal to 0.01 inches or 0.005 inches or 0.01 inches deep, or otherwise less than the depth of the liner but deep enough to cause preferential tearing at the location of the structurally weakened region). And the person of ordinary skill in the art will appreciate that other methods for structurally weakening a material can be used to cause the liner to be more easily torn. And the person of ordinary skill in the art will recognize that, in various embodiments described below, while terms like "holes" and "perforations" are used, other types of structural weakening can be used in their stead.

In certain embodiments, one or more of the structurally weakened regions may take the form of a continuous or discontinuous structurally weakened region such as a continuous perforation or a discontinuous perforation that extends substantially from the first edge to the second edge of the plaster board. That is, the first liner may include one or more sections (e.g., strips) that are separable along one or more continuous perforations (e.g., slices formed in the material of the liner) that extend from the first edge to the second edge of the plaster board. Alternatively, the first liner may include one or more rows of holes or partially perforated regions that extend substantially from the first edge to the second edge of the plaster board (e.g., rows arranged in parallel). Such holes or partially perforated regions may be defined by shapes such as a point, a rounded area, or any other polygon. Such continuous perforations or rows of structurally weakened regions may be separated from one another by distances in the range, for example, of about 0.025 inches to about 2 inches, e.g., by distances substantially equal to 0.0625 inches, 0.125 inches, 0.25 inches, 0.5 inches, or 1 inch. In some embodiments, each of the one or more structurally weakened regions of the first liner is separated from another structurally weakened region of the first liner by no more than 0.0625 inches, 0.125 inches, 0.25 inches, or 0.5 inches. Providing structurally weakened regions at such spacings may facilitate formation (e.g., via scoring and snapping) of plaster boards of shapes and sizes that may be desirable in the field.

In particular embodiments, the plaster board has a third edge and an opposing fourth edge (e.g., that are both substantially perpendicular to the first and second edges). Accordingly, the one or more structurally weakened regions of the first liner may include structurally weakened regions arranged substantially parallel to one another and each extending substantially from the third edge to the fourth edge. In addition, the structurally weakened regions that extend substantially from the third edge to the fourth edge of the plaster board may be substantially perpendicular to the structurally weakened regions that extend substantially from the first edge to the second edge of the plaster board. The structurally weakened regions that extend substantially from the third edge to the fourth edge of the plaster board may be separated from one another by distances in the range, for example, of about 0.025 inches to about 2 inches, e.g., by distances substantially equal to 0.0625 inches, 0.125 inches, 0.25 inches, 0.5 inches, or 1 inch.

Aside from direction of alignment, the structurally weakened regions of the first liner that extend substantially from the third edge to the fourth edge of the plaster board may have any or all of the features described above that pertain to the structurally weakened regions that extend substantially from the first edge to the second edge of the plaster board.

The structurally weakened regions that extend substantially from the first edge to the second edge of the plaster board and the structurally weakened regions that extend substantially from the third edge to the fourth edge of the plaster board may, in some embodiments, together form a two-dimensional array of structurally weakened regions such as perforations (e.g., holes) formed in the first liner (e.g., a rectangular or square array). In such embodiments, a given perforation (e.g., a parallelogram-shaped hole) may be part of both a structurally weakened region extending substantially from the first edge to the second edge of the plaster board, and a structurally weakened region extending substantially from the third edge to the fourth edge of the plaster board. Such holes may be formed as polygons having one or more edges that are not parallel with any of the first, second, third, and fourth edges. The polygons may take the form of one or more of a parallelogram, a rectangle, a diamond, or a square, for example. Such polygons may have varying shapes and sizes when compared to each other.

The plaster board may, in certain embodiments, further include a second liner (e.g., paper, fiberglass, plastic, thermoplastic, or paper/fiberglass composite) attached to the first surface of the second layer of hardened plaster material. The second liner may include one or more structurally weakened regions. Each of the structurally weakened regions of the second liner may extend substantially from the first edge to the second edge of the plaster board. In this context, the first material (e.g., the first polymer material) of the plaster board is disposed between the first liner and the second liner. Aside from being a part of the second liner, the one or more structurally weakened regions of the second liner may include any or all of the features of the one or more structurally weakened regions of the first liner, as described above.

For example, one or more of the structurally weakened regions of the second liner may take the form of a continuous perforation or a discontinuous perforation that extends substantially from the first edge to the second edge of the plaster board. That is, the second liner may include one or more sections (e.g., strips) that are separated along one or more continuous perforations (e.g., slices) that extend from the first edge to the second edge of the plaster board. Alternatively, the second liner may include one or more rows of holes or partially perforated regions that extend substantially from the first edge to the second edge of the plaster board (e.g., rows arranged in parallel). Such holes or partially perforated regions may be defined by shapes such as a point, a rounded area, or any other polygon. Such continuous perforations or rows of structurally weakened regions may be separated from one another by distances in the range, for example, of about 0.025 inches to about 2 inches, e.g., by distances substantially equal to 0.0625 inches, 0.125 inches, 0.25 inches, 0.5 inches, or 1 inch. In some embodiments, each of the one or more structurally weakened regions of the second liner is separated from another structurally weakened region of the second liner by no more than 0.0625 inches, 0.125 inches, 0.25 inches, or 0.5 inches.

In particular embodiments, the one or more structurally weakened regions of the second liner may include structurally weakened regions arranged substantially parallel to one another and each extending substantially from the third edge to the fourth edge. In addition, the structurally weakened regions of the second liner that extend substantially from the third edge to the fourth edge of the plaster board may be substantially perpendicular to the structurally weakened regions of the second liner that extend substantially from the first edge to the second edge of the plaster board. The structurally weakened regions of the second liner that extend substantially from the third edge to the fourth edge of the plaster board may be separated from one another by distances in the range, for example, of about 0.025 inches to about 2 inches, e.g., by distances substantially equal to 0.0625 inches, 0.125 inches, 0.25 inches, 0.5 inches, or 1 inch.

Aside from direction of alignment, the structurally weakened regions of the second liner that extend substantially from the third edge to the fourth edge of the plaster board may have any or all of the features described above that pertain to the structurally weakened regions of the second liner that extend substantially from the first edge to the second edge of the plaster board.

The structurally weakened regions of the second liner that extend substantially from the first edge to the second edge of the plaster board and the structurally weakened regions of the second liner that extend substantially from the third edge to the fourth edge of the plaster board may together form a two-dimensional array of holes formed in the second liner (e.g., a rectangular or square array). In such embodiments, a given perforation (e.g., a parallelogram-shaped hole) may be part of both a structurally weakened region extending substantially from the first edge to the second edge of the plaster board, and a structurally weakened region extending substantially from the third edge to the fourth edge of the plaster board. Such holes may be formed as polygons having one or more edges that are not parallel with any of the first, second, third, and fourth edges. The polygons may take the form of one or more of a parallelogram, a rectangle, a diamond, or a square, for example. Such polygons may have varying shapes and sizes when compared to each other.

In particular embodiments, one or more portions of the first layer of hardened plaster material extend through at least one of the structurally weakened regions of the first liner that take the form of a perforation. Additionally, the portion of the first layer of hardened plaster material that extends through the at least one of the structurally weakened regions of the first liner may form a substantially flat surface of hardened plaster material disposed between the first liner and the first material (e.g., the first polymer material).

In a similar fashion, one or more portions of the second layer of hardened plaster material may extend through at least one of the structurally weakened regions of the second liner that take the form of a perforation. Additionally, the portion of the second layer of hardened plaster material that extends through the at least one of the structurally weakened regions of the second liner may form a substantially flat surface of hardened plaster material disposed between the second liner and the first material (e.g., the first polymer material). These features may help facilitate the formation of planar fissures that propagate through both the first and second layers of hardened plaster material.

In embodiments where the one or more structurally weakened regions of the first liner include partially but not completely perforated regions, such partially perforated regions may have a depth (e.g., an indention) that is at least 0.001 inches deep, e.g., at least 0.005 inches deep, or at least 0.01 inches deep, or in the range of 0.001-0.012 inches deep, or in the range of 0.005 inches to 0.012 inches deep, or in the range of 0.01 inches to 0.02 inches deep, substantially equal to 0.01 inches or 0.005 inches or 0.01 inches deep or otherwise less than the depth of the first liner but deep enough to cause preferential tearing at the location of the structurally weakened region.

In embodiments where the one or more structurally weakened regions of the second liner include partially but not completely perforated regions, such partially perforated regions may have a depth (e.g., an indention) that is at least 0.001 inches deep, e.g., at least 0.005 inches deep, or at least 0.01 inches deep, or in the range of 0.001-0.012 inches deep, or in the range of 0.005 inches to 0.012 inches deep, or in the range of 0.01 inches to 0.02 inches deep, substantially equal to 0.01 inches or 0.005 inches or 0.01 inches deep, or otherwise less than the depth of the second liner but deep enough to cause preferential tearing at the location of the structurally weakened region.

Another aspect of the disclosure includes a method of forming the aforementioned plaster boards. For example, the method includes providing a first plaster board blank having a first layer of hardened plaster material having a first surface, and a first liner attached to the first surface of the first layer of hardened plaster material. The first liner includes one or more structurally weakened regions each extending substantially from the first edge to the second edge of the plaster board. The method further includes providing a second plaster board blank having a second layer of hardened plaster material having a first surface and adhering a first material (e.g., a first polymer material) between the first liner and the first surface of the second layer of hardened plaster material.

In particular embodiments, providing the first plaster board blank includes dispensing a first wet plaster material such that the first wet plaster material is in contact with the first liner having the one or more structurally weakened regions and drying the first wet plaster material such that the first wet plaster material hardens into the first layer of hardened plaster material and the first liner is attached to the first surface of the first layer of hardened plaster material.

In other embodiments, providing the first plaster board blank includes dispensing a first wet plaster material such that the first wet plaster material is in contact with the first liner, processing the first liner while the first wet plaster material is in contact with the first liner to form the one or more structurally weakened regions of the first liner, and drying the first wet plaster material such that the first wet plaster material hardens into the first layer of hardened plaster material and the first liner is attached to the first surface of the first layer of hardened plaster material.

In particular embodiments, dispensing the first wet plaster material includes causing a portion of wet plaster material to seep through at least one of the one or more structurally weakened regions of the first liner to form a layer of wet plaster material on a surface of the first liner that faces away from the first layer of wet plaster material.

Some embodiments include dispensing a layer of wet plaster material on a surface of the first liner that faces away from the first layer of wet plaster material.

In yet other embodiments, providing the first plaster board blank includes processing (e.g., mechanically) the first liner while the first liner is attached to the first surface of the first layer of hardened plaster material to form the one or more structurally weakened regions of the first liner.

In particular embodiments, processing the first liner and/or the second liner to produce structurally weakened regions includes dispensing a pattern of acid that weakens regions of the liner, applying heat via a heated object to selected regions of the liner, and/or illuminating selected regions of the liner with UV light. Other examples are possible.

In any of the above embodiments, processing the first liner may include perforating the first liner with one or more rollers that include one or more perforating blades.

In some embodiments, providing the second plaster board blank includes providing the second plaster board blank having a second liner attached to the first surface of the second plaster board blank. In this context, the second liner includes one or more structurally weakened regions extending substantially from the first edge to the second edge of the plaster board.

In particular embodiments, providing the second plaster board blank includes dispensing a second wet plaster material such that the second wet plaster material is in contact with the second liner having the one or more structurally weakened regions, and drying the second wet plaster material such that the second wet plaster material hardens into the second layer of hardened plaster material and the second liner is attached to the first surface of the second layer of hardened plaster material.

In other embodiments, providing the second plaster board blank includes dispensing a second wet plaster material such that the second wet plaster material is in contact with the second liner, processing the second liner while the second wet plaster material is in contact with the second liner to form the one or more structurally weakened regions of the second liner, and drying the second wet plaster material such that the second wet plaster material hardens into the second layer of hardened plaster material and the second liner is attached to the first surface of the second layer of hardened plaster material.

In yet other embodiments, providing the second plaster board blank includes processing the second liner while the second liner is attached to the first surface of the second layer of hardened plaster material to form the one or more structurally weakened regions of the second liner.

In any of the above embodiments, processing the second liner may include perforating the second liner with one or more rollers each comprising one or more perforating blades.

In some embodiments, the first material (e.g., the first polymer material) is adhered to the first liner and to the second liner. But in other embodiments, the first material (e.g., the first polymer material) is adhered to the first liner and to the first surface of the second layer of hardened plaster material. In these latter embodiments, providing the second plaster board blank may include removing (e.g., abrasively) a liner from the first surface of the second layer of hardened plaster material to expose the first surface of the second layer of hardened plaster material.

Another aspect of the disclosure is a method of forming a planar fissure in any of the aforementioned plaster boards. The method includes scoring the first layer of hardened plaster material on its second surface along a line that passes over one or more of the one or more structurally weakened regions of the first liner or one or more of the one or more structurally weakened regions of the second liner; and snapping the plaster board across the scored line, the snapping being performed such that the first liner and/or the second liner is separated along a substantially linear perforation.

Another aspect of the disclosure is a method of forming a planar fissure in any of the aforementioned plaster boards. The method includes scoring the second layer of hardened plaster material on its second surface along a line that passes over one or more of the one or more structurally weakened regions of the first liner or one or more of the one or more structurally weakened regions of the second liner; and snapping the plaster board across the scored line, the snapping being performed such that the first liner and/or the second liner is separated along a substantially linear perforation.

One embodiment of a plaster board is described below with respect to FIG. 1, which shows three views of a plaster board 100. The upper-left portion of FIG. 1 is a y-z plane view of the plaster board 100. The upper-right portion of FIG. 1 is an x-y plane view of the plaster board 100. The lower portion of FIG. 1 is an x-z plane view of the plaster board 100.

The plaster board 100 has an edge 102 and an edge 104 that is opposite the edge 102. The plaster board 100 includes a layer of hardened plaster material 106 having a surface 108 and a surface 110 that is opposite the surface 108. The plaster board 100 further includes a liner 112 that is attached to the surface 108 of the layer of hardened plaster material 106. The plaster board 100 further includes a layer of hardened plaster material 114 having a surface 116 and a surface 118 that is opposite the surface 116. The plaster board 100 further includes a first material (e.g., a first polymer material) 120 adhered between the liner 112 and the surface 116 of the layer of hardened plaster material 114.

Also shown in FIG. 1 is a liner 122 that is attached to the surface 116 of the layer of hardened plaster material 114. The plaster board 100 may also include a liner 202 that is attached to the surface 110 of the layer of hardened plaster material 106 and a liner 204 that is attached to the surface 118 of the layer of hardened plaster material 114.

As the person of ordinary skill in the art will appreciate, the plaster boards described herein may be made using a variety of different inorganic base materials. For example, in certain embodiments of the plaster boards and methods as otherwise described herein, the plaster material comprises a base material that is a gypsum material. In other embodiments of the plaster boards and methods as otherwise described herein, the plaster material comprises a base material that is, for example, lime or cement. In certain embodiments, the plaster material includes two base materials, for example, one generally on one side of the liner(s) and/or first material (e.g., first polymer material), and the other on the other side of the liner(s) and/or first material (e.g., the first polymer material). The hardened plaster material may include one or more fillers or additives in the base plaster material(s), e.g., fiberglass, a plasticizer material, and/or a foaming agent.

The person of ordinary skill in the art will appreciate that a variety of first materials can be adhered between the first liner and the first surface of the second layer of hardened plaster material, depending on the desired functionality to be imparted to the plaster board. In certain embodiments, the first material is a first polymer material. For example, in certain embodiments described in more detail below, the first polymer material is a viscoelastic polymer. Viscoelastic polymers can desirably provide sound and vibration damping functionality to the plaster board. In other embodiments, the first polymer material is a foamed polymer, e.g., an open-cell polymer. Foamed polymers can provide reduced mass and reduced sound transmission to a plaster board. Of course, other types of polymers can be used as the first polymer material to provide other functionalities, e.g., fire-resistant polymers to provide additional fire resistance to the plaster board.

The first polymer material may include or be filled with a variety of additives to provide additional functionality, e.g., such as a fire resistant material (e.g., zinc borate) and/or a mold resistant material.

As described above, in various embodiments of the plaster boards and methods as described herein, the first material can be provided in a variety of fashions. For example, in certain embodiments, the first polymer material is a single layer of a material (e.g., a single layer of a polymer material), or is a laminate of a plurality of materials (e.g., a plurality of polymers). In other embodiments, the first material can take the form of a carrier sheet having a material (e.g., a polymer) disposed thereon. The carrier sheet (whether used in a damping layer or in a different continuous layer) can be formed from a variety of materials, e.g., sheet materials that are capable of carrying a separate material such as a polymer. For example, in certain embodiments of the plaster boards and methods as described herein, the carrier sheet comprises (or is) a paper sheet. In other embodiments of the plaster boards and methods as described herein, the carrier sheet comprises (or is) a fiberglass mat or a fiberglass fabric. In other embodiments of the plaster boards and methods as described herein, the carrier sheet comprises (or is) a woven or non-woven fabric, such as a felt. In other embodiments of the plaster boards and methods as described herein, the carrier sheet comprises (or is) a sheet of foamed polymer, e.g., the foamed polymer sheet sold by BASF under the trade name BASOTECT. In other embodiments of the plaster boards and methods as described herein, the carrier sheet comprises (or is) a polymer sheet, e.g., a thin polymer sheet of the type typically used as a plastic release liner for an adhesive, which can be, for example in the range of 0.001-0.002" thick. In other embodiments, the carrier sheet can be an adhesive sheet, e.g., with adhesive such as a pressure-sensitive adhesive presented at one or both surfaces thereof. Such pressure-sensitive adhesive sheets can be formed from a core sheet (made, e.g., from PVC or PET) with adhesive (e.g., a silicone pressure-sensitive adhesive or a polyacrylate adhesive) disposed on both sides thereof.

The first material (e.g., the first polymer material) can be disposed on the carrier sheet in variety of manners. For example, in certain embodiments of the plaster boards and methods as described herein, the first material (e.g., the first polymer material) is impregnated on the carrier sheet (e.g., when the carrier sheet has some level of porosity). In certain embodiments, the first material (e.g., the first polymer material) is formed as a layer on one or both sides of the carrier sheet. The first material (e.g., the first polymer material) can, for example, be impregnated into the pores of the carrier sheet and form layers on either side of the carrier sheet.

As noted above, a variety of first materials (e.g., first polymer materials) can be used in the plaster boards and methods of the disclosure. In various embodiments of the plaster boards and methods as described herein, the first polymer material is a viscoelastic polymer. In certain such embodiments, the viscoelastic polymer is polyvinyl butyral, a silicone, or an acrylic. The viscoelastic polymer can also be a thermally-cured material, e.g., a cured adhesive such as those available under the tradename GreenGlue. Various viscoelastic glues made by Weber may also be suitable for use. Viscoelastic polymer compositions are also described in U.S. Pat. Nos. 8,028,800 and 9,157,241, each of which is hereby incorporated herein by reference in its entirety.

In certain embodiments, the viscoelastic polymer can have, for example, a damping loss factor greater than 1%, e.g., greater than 2%, or greater than 3%, or greater than 5%, or greater than 10%, or greater than 25%, or greater than 50%, or even greater than 100%. For example, in various embodiments of the plaster boards and methods of the disclosure, the viscoelastic polymer has a damping loss factor the range of 1%-300%, or 2%-300%, or 3%-300%, or 5%-300%, or 10%-300%, or 25%-300%, or 50%-300%, or 100%-300%, This can be compared with the much lower value, lower than 1% for typical plaster materials such as gypsum. As referred to herein, and as would be appreciated by the person of ordinary skill in the art, a "damping loss factor" is a dimensionless metric of how efficient a material is at dissipating mechanical vibrations (e.g., sound waves) as heat. In a laminated gypsum board, as in other laminated structures, the working mechanism for noise and vibration control is known as constrained layer damping (CLD). Energy dissipation in laminated gypsum board is achieved by shearing the viscoelastic polymer between two layers of gypsum. The energy dissipation provided by the interlayer is quantified by the loss factor (q), a dimensionless quantity that can be measured directly or predicted from the modal damping of a dynamic system based on the RKU algorithm. Several standards are available for measuring the damping of a laminated structure (e.g., SAE J1737 or ISP 16940-2009); however, as used herein, ASTM E75-05 is used to measure the damping loss factor. Damping loss factor is further described in Crane, R. and Gillespie, J., "A Robust Testing Method for Determination of the Damping Loss Factor of Composites," Journal of Composites, Technology and Research, Vol. 14, No. 2, 1992, pp. 70-79; Kerwin et al., "Damping of Flexural Vibrations by means of Constrained Viscoelastic Laminate," Journal of Acoustic Society of America, 1959, pp. 952-962; and Ross, D. et al., "Damping of Flexural Vibrations by Means of Viscoelastic laminate", in Structural Damping, ASME, New York, 1959.

In various particular embodiments, the viscoelastic polymer is in the form of a glue, a resin, or an epoxy, for example. Desirably, the viscoelastic polymer exhibits large stress/strain delay or phase difference under loading. These materials can be characterized by Dynamic-Mechanical Analysis (DMA), a technique commonly used to measure the mechanical and damping properties of polymer materials. The shear modulus (also known as the modulus of rigidity) is defined as the ratio of shear stress to shear strain; in certain particular embodiments as otherwise described herein, the viscoelastic polymer has a shear modulus in the range of 10 kPa to 100 MPa, e.g., 10 kPa-50 MPa, or 10 kPa-10 MPa, or 10 kPa-1 MPa, or 50 kPa to 100 MPa, or 50 kPa-50 MPa, or 50 kPa-10 MPa, or 50 kPa-1 MPa, or 100 kPa to 100 MPa, or 100 kPa-50 MPa, or 100 kPa-10 MPa, or 100 kPa-1 MPa. This can be compared to the elastic modulus of plaster materials (e.g., ~2 GPa for gypsum).

In certain desirable embodiments of the plaster boards and methods as described herein, the viscoelastic polymer is substantially less rigid than the hardened plaster material. For example, in certain embodiments, the viscoelastic polymer is at least 20% less, or even at least about 40% less rigid or stiff than the body of hardened plaster material. There are a variety of tests of rigidity (e.g., SAE J1737 and ISP 16940-2009), but as used herein, rigidity is measured via ASTM E75-05. In other embodiments, the plaster board is substantially less rigid (e.g., at least 20% less rigid or at least 40% less rigid) than an otherwise identical plaster board lacking the viscoelastic polymer.

In other embodiments, the first polymer material is a foamed polymer, e.g., an open-cell polymer. Foamed polymer materials can be provided, for example, in sheet form, or can be foamed and cured during the manufacturing of the plaster board. One suitable example of a foamed polymer material is the foamed melamine resin sold by BASF under the BASOTECT tradename.

In other embodiments, the first polymer material is a fire-resistant polymer material.

Of course, the person of ordinary skill in the art will appreciate that a variety of other types of materials can be used as the first material.

One or more of the liner(s) and/or the first material (e.g., the first polymer material) can, but need not extend to all edges of the plaster board. For example, in the embodiment of FIG. 1, the liners 112 and 122 and the first material (e.g., the first polymer material) 120 extend substantially throughout the plaster board 100 within the x-y plane and/or substantially parallel to the surfaces 108, 110, 116, and 118 to all four edges 102, 104, 124, and 126 of the rectangular board. In certain embodiments, the liner(s) and the first material (e.g., the first polymer material) extend to at least two opposed lateral edges of the plaster board.

As the person of ordinary skill in the art will appreciate, one or more of the liner(s) and/or the first material (e.g., the first polymer material) are desirably embedded substantially within the plaster board. For example, in certain embodiments of the plaster boards and methods as otherwise described herein, the thickness of hardened plaster material on one side of the liner(s) and the first material (e.g., the first polymer material) is within the range of 33%-300% (e.g., 50%-200%, or 75%-150%) of the thickness of the hardened plaster material on the other side of the liner(s) and the first material (e.g., the first polymer material). In certain such embodiments, the thickness of the hardened plaster material on one side of the liner(s) and the first material (e.g., the first polymer material) is within 10% of the thickness of the hardened plaster material on the other side of the liners and the first material (e.g., the first polymer material). For example, in the embodiment of FIG. 1 (as shown in the lower portion thereof), the layer of hardened plaster material 106 that is above the liner 112 is substantially equal in thickness along the z-axis when compared to the layer of hardened plaster material 114 that is below the liner 112 and/or the liner 122. Of course, in other examples, the respective layers of hardened plaster material above and below the liner(s) and first material (e.g., the first polymer material) may have unequal thicknesses along the z-axis. This variability in the placement of the liner(s) and first material (e.g., the first polymer material) may affect the characteristics (e.g., sound damping characteristics) of the plaster board as described below. And in other embodiments, the variability in placement of the liner(s) and first material (e.g., the first polymer material) may affect other characteristics of the plaster board, such as mechanical strength, nail pull strength and score-snap performance; the person of ordinary skill in the art will select a desired placement to provide the desired properties to the board. Moreover, the different layers of the hardened plaster material can have different densities and/or microstructures (or other properties), e.g., through the differential use of fillers or foaming agents; this, too, can be used to tailor board properties, particularly acoustic properties.

In certain embodiments of the plaster boards and methods as otherwise described herein, there is at least 0.15, or even at least 0.2 inches of thickness of the layers of hardened plaster material on either side of the liner(s) and/or the first material (e.g., the first polymer material).

The plaster boards of the present disclosure may be made in a variety of thicknesses. The person of ordinary skill in the art will select a desirable thickness for a particular end use. In certain embodiments of the plaster boards and methods as otherwise described herein, the total thickness of the plaster board (i.e., along the z-axis between the surfaces 110 and 118 of FIG. 1) is at least 0.25 inches and no more than 2 inches, e.g., in the range of 0.30 inches to 1.25 inches or in the range of 0.5 inches to 1 inch. In certain particular embodiments, the total thickness of the plaster board is substantially equal to 0.375 inches. In other particular embodiments, the total thickness of the plaster board is substantially equal to 0.5 inches. In still other particular embodiments, the total thickness of the plaster board is substantially equal to 0.625 inches. And in still other particular embodiments, the total thickness of the plaster board is substantially equal to one inch (e.g., especially when lower density plaster materials are used).

The person of ordinary skill in the art will appreciate, however, that the presently disclosed methods and boards can be of a variety of thicknesses and weights. For example, the board can be a lightweight board ⅝" in thickness with a weight on the order of 1400 lb/MSF (MSF=1,000 square feet), or can be a lightweight board 1" in thickness with a weight on the order of 2240 lb/MSF. Generally, boards can be made in any desirable weight, for example, from lightweight (1150 lb/MSF) to normal weight (2000 lb/MSF) to heavy weight (3000 lb/MSF), in any desirable thickness (e.g., ½", ⅝" or 1" thick). And as the person of ordinary skill in the art will appreciate, additional thin layers of plaster material (e.g., gypsum, usually of higher density than the bulk material) can be applied to the outsides of the paper or fiberglass layers cladding the plaster material core, in order to help improve mechanical strength.

Figure 2:
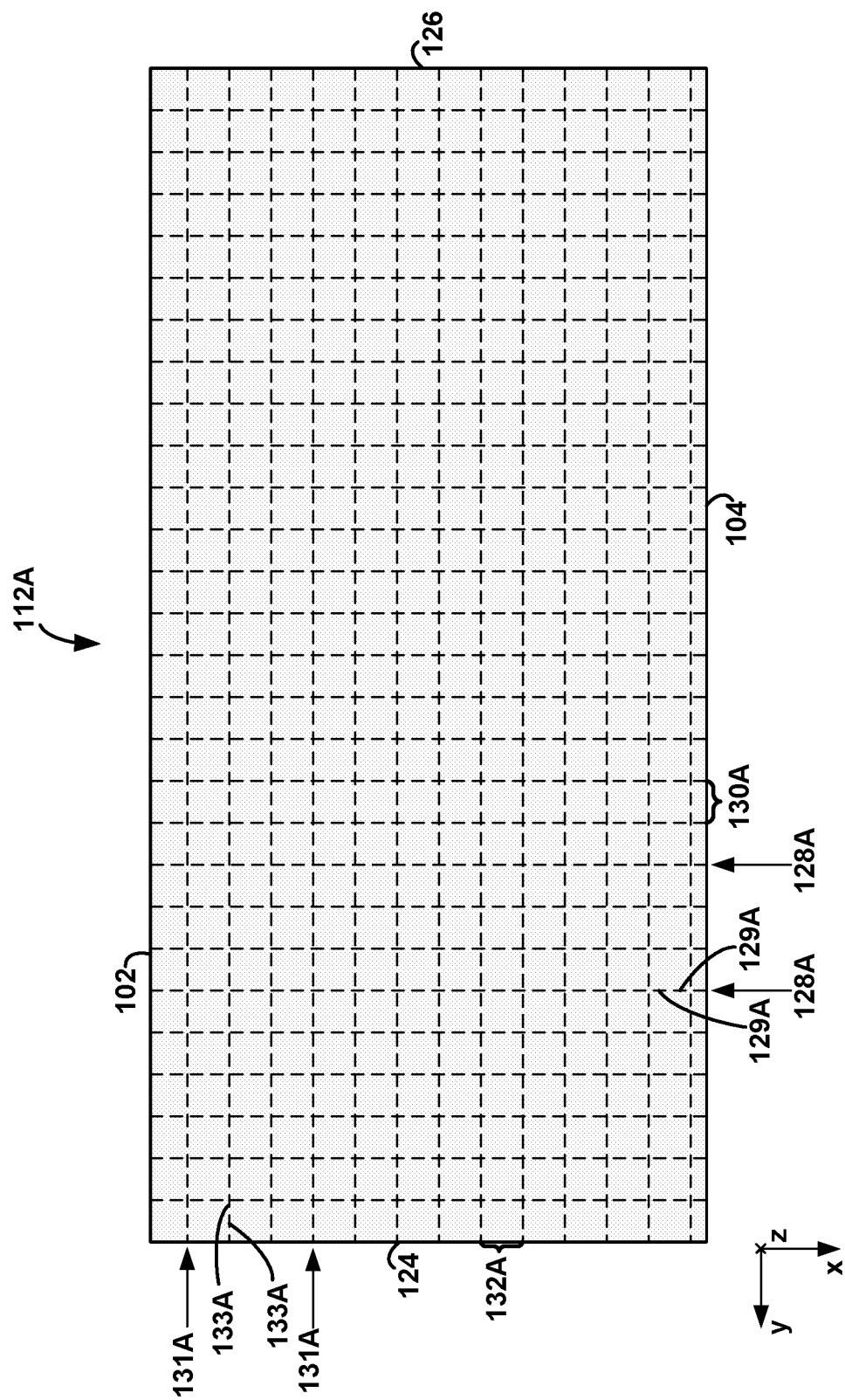
FIG. 2 is a cross-sectional view of a plaster board depicting a liner according to another embodiment of the disclosure.

FIG. 2 depicts a liner 112A that represents an embodiment of the liner 112 shown in FIG. 1. The liner 112A includes structurally weakened regions 128A that extend from the edge 102 to the edge 104 of the plaster board 100. In some examples, the structurally weakened regions of the first liner might only span most of the distance between the first edge and the second edge of the plaster board. As used herein, extending substantially from one edge to another edge is interpreted as extending at least 50% of the distance between the edges. In certain embodiments, extending substantially from one edge to another edge means extending at least 60%, at least 70%, at least 80%, at least 90%, 50-95%, 60-95%, 70-95%, 80-95%, 50-90%, 60-90%, 70-90%, 50-80% or 60-80% of the distance between the edges.

In certain embodiments, at least one structurally weakened region of the one or more structurally weakened regions of the first liner is a discontinuous perforation (e.g., a row of perforations), taking the form of a dashed or dotted line, for example. As shown in FIG. 2, the structurally weakened regions 128A take the form of dashed lines that extend between the edges 102 and 104. Additionally, at least one structurally weakened region of the first liner is formed as a row of holes in the first liner. For example, one or more of the structurally weakened regions 128A may include several holes 129A aligned in a row. Additionally or alternatively, such holes may take the form of rounded holes, polygonal holes, and/or point holes in the first liner.

Figure 3:
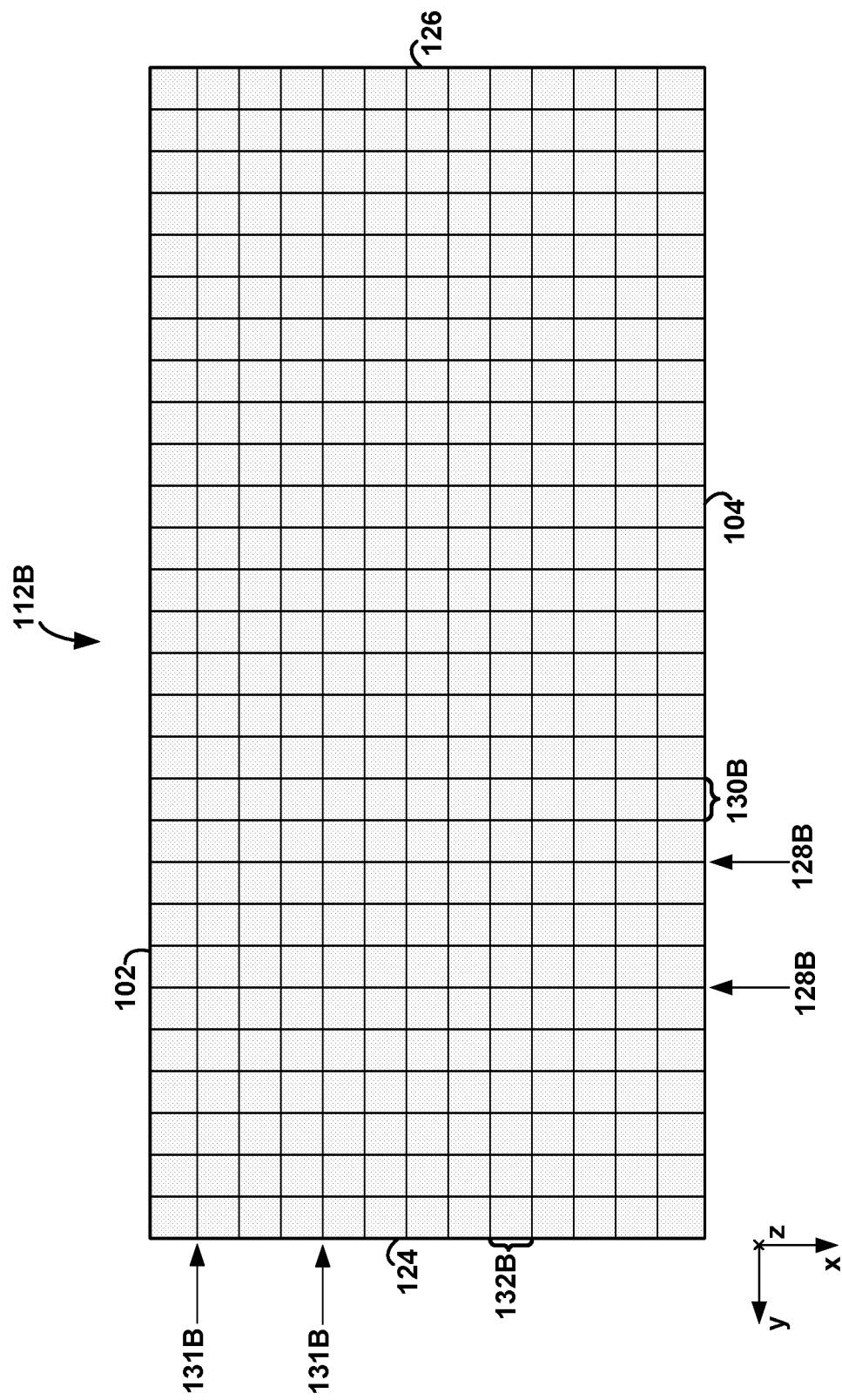
FIG. 3 is a cross-sectional view of a plaster board depicting a liner according to another embodiment of the disclosure.

Also, at least one structurally weakened region of the one or more structurally weakened regions of the first liner may include a substantially continuous perforation. For instance, FIG. 3 depicts a liner 112B, which represents another embodiment of the liner 112, in which structurally weakened regions 128B each take the form of substantially continuous perforations that span the entirety of the distance between the edge 102 and the edge 104. As used herein, a "substantially continuous perforation" can be interpreted as a perforation that forms a complete separation between adjacent portions of the first (or second) liner and spans most of the distance between the first and second edges of the plaster board. In some examples, the substantially continuous perforation is referred to as a "slice" or a "substantially linear slice."

In certain embodiments, the one or more structurally weakened regions of the first liner include a first plurality of structurally weakened regions arranged substantially parallel to one another. In some embodiments, one or more of the first plurality of structurally weakened regions of the first liner are separated from each other by respective distances that are substantially equal to each other or by respective randomly determined distances.

As shown in FIG. 2, the structurally weakened regions 128A are arranged in parallel with one another and extend between the edges 102 and 104. Additionally, as shown in FIG. 3, the structurally weakened regions 128B are arranged in parallel with one another and extend between the edges 102 and 104.

The first plurality of structurally weakened regions of the first liner may be separated from one another by a distance that is substantially equal to 0.0625 inches, 0.125 inches, 0.25 inches, or 0.5 inches. As shown in FIG. 2, the structurally weakened regions 128A are separated from one another by distances 130A that can be substantially equal to 0.0625 inches, 0.125 inches, 0.25 inches, 0.5 inches, or any other suitable distance. The distances 130A may be substantially equal to each other or determined randomly. Similarly, as shown in FIG. 3, the structurally weakened regions 128B are separated from one another by distances 130B that can be substantially equal to 0.0625 inches, 0.125 inches, 0.25 inches, 0.5 inches, or any other suitable distance. The distances 130B may be substantially equal to each other or determined randomly.

In some embodiments, the plaster board has a third edge and an opposing fourth edge. The third and fourth edges may be substantially perpendicular to the first and second edges of the plaster board to form a rectangle, for example. In this context, the one or more structurally weakened regions of the first liner may further include a second plurality of structurally weakened regions arranged substantially parallel to one another and each extending substantially from the third edge to the fourth edge. The second plurality of structurally weakened regions of the first liner may each be substantially perpendicular to the first plurality of structurally weakened regions of the first liner.

In particular embodiments, one or more of the second plurality of structurally weakened regions of the first liner are separated from one another by respective distances that are substantially equal to each other or by respective randomly determined distances.

As shown in FIG. 2, the structurally weakened regions 131A of the liner 112A are parallel to one another and perpendicular to the structurally weakened regions 128A. Also, the structurally weakened regions 131A extend from the edge 124 to the edge 126 and are separated from one another by distances 132A that can be substantially equal to 0.0625 inches, 0.125 inches, 0.25 inches, 0.5 inches, or any other suitable distance. The distances 132A may be substantially equal to each other or determined randomly. As similarly shown in FIG. 3, the structurally weakened regions 131B of the liner 112B are parallel to one another and perpendicular to the structurally weakened regions 128B. Also, the structurally weakened regions 131B extend from the edge 124 to the edge 126 and are separated from one another by distances 132B that can be substantially equal to 0.0625 inches, 0.125 inches, 0.25 inches, 0.5 inches, or any other suitable distance. The distances 132B may be substantially equal to each other or determined randomly.

In particular embodiments, the first plurality of structurally weakened regions of the first liner and the second plurality of structurally weakened regions of the first liner are formed as a two-dimensional array of holes formed in the first liner. In some embodiments, the first plurality of structurally weakened regions of the first liner and the second plurality of structurally weakened regions of the first liner form a checkerboard pattern.

Figure 4:
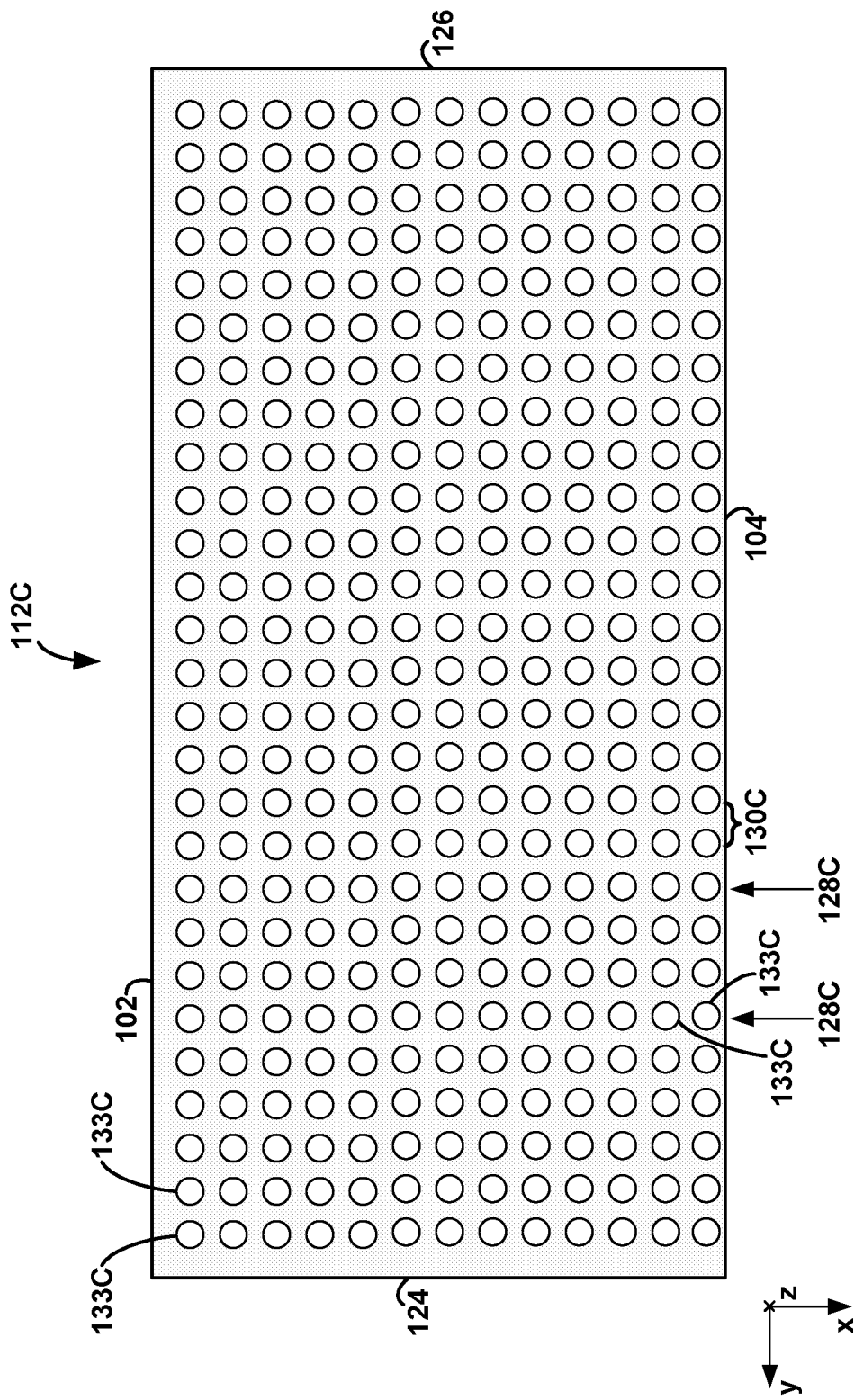
FIG. 4 is a cross-sectional view of a plaster board depicting a liner according to another embodiment of the disclosure.

As shown in FIG. 2, the holes 129A (e.g., dashed lines) of the structurally weakened regions 128A and the holes 133A (e.g., dashed lines) of the structurally weakened regions 131A form a two-dimensional array of holes in the liner 112A. Additionally, the holes 129A and 133A form a checkerboard pattern defined by discontinuous perforations, as shown. As shown in FIG. 4, the holes 133C of the structurally weakened regions 128C of the liner 112C form a two-dimensional array of holes. The liner 112C represents yet another embodiment of the liner 112 shown in FIG. 1.

Figure 5:
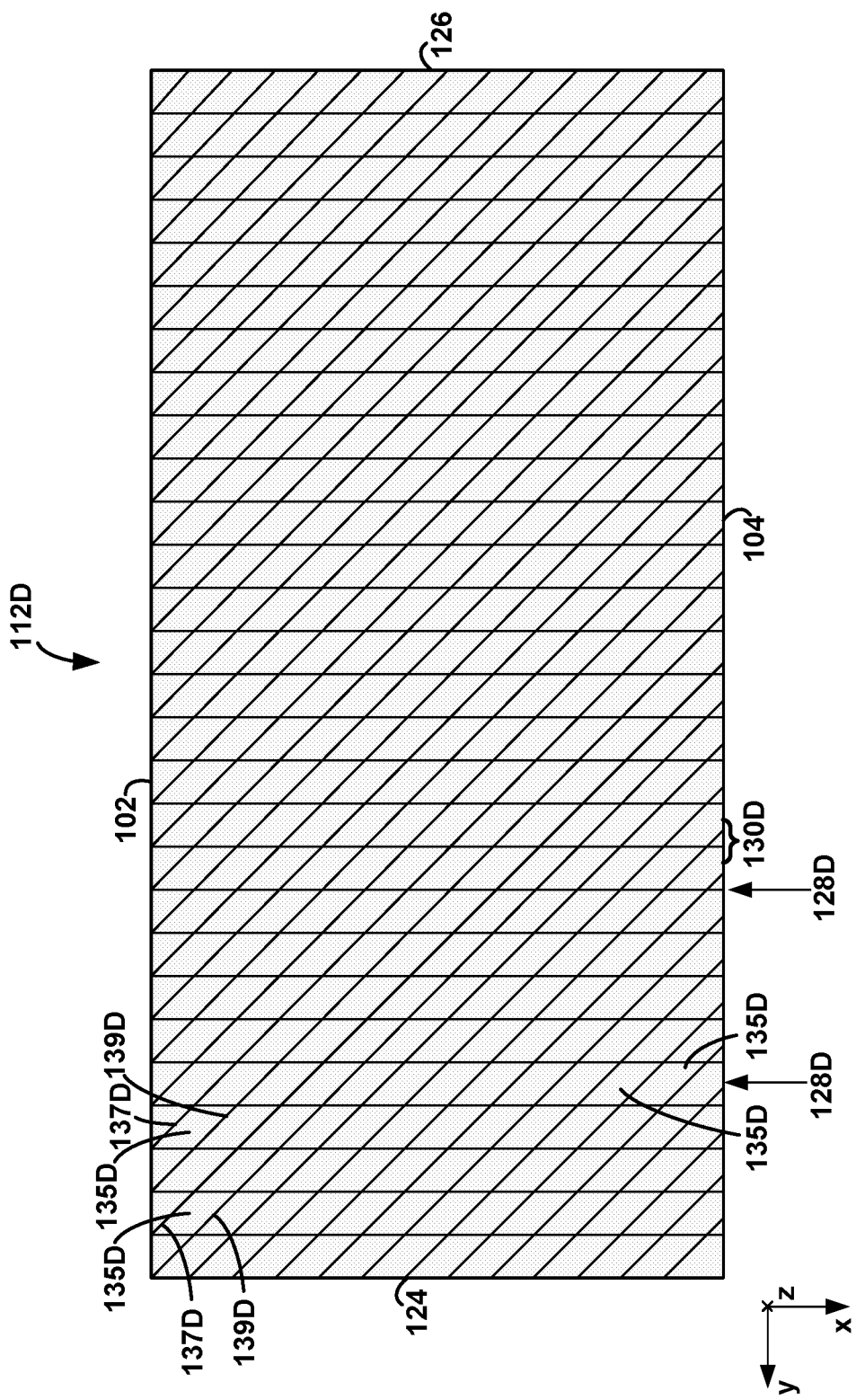
FIG. 5 is a cross-sectional view of a plaster board depicting a liner according to another embodiment of the disclosure.

In some examples, structurally weakened regions within the first liner may be formed having one or more (e.g., diagonal) edges that are not parallel with any of the first, second, third, or fourth edges of the plaster board. See, for example, FIG. 5, in which yet another embodiment of the liner 112 is shown, namely, the liner 112D. In FIG. 5, the structurally weakened regions 128D include rows of diamond-shaped portions 135D of the liner 112D that are defined by diamond-shaped perforations. The edges 137D and 139D of the perforations are not parallel with any of the edges 102, 104, 124, or 126, as shown. This feature may facilitate the propagation of fissures through the plaster board at areas that are between perforations that are parallel with the edges 102 and 104 or parallel with the edges 124 and 126.

In other examples, such diamond-shaped perforations or portions of the first (or second liner) that are defined by such perforations may instead take the shape of one or more of a parallelogram, a rectangle, a diamond, or a square. In various examples, the first (or second liner) may have perforated regions having shapes and sizes defined by any number of different polygons.

In particular embodiments, the plaster board further includes a second liner attached to the first surface of the second layer of hardened plaster material. The second liner may include one or more structurally weakened regions that extend substantially from the first edge to the second edge of the plaster board. In this context, the first material (e.g., the first polymer material) is disposed between the first liner and the second liner.

Figure 6:
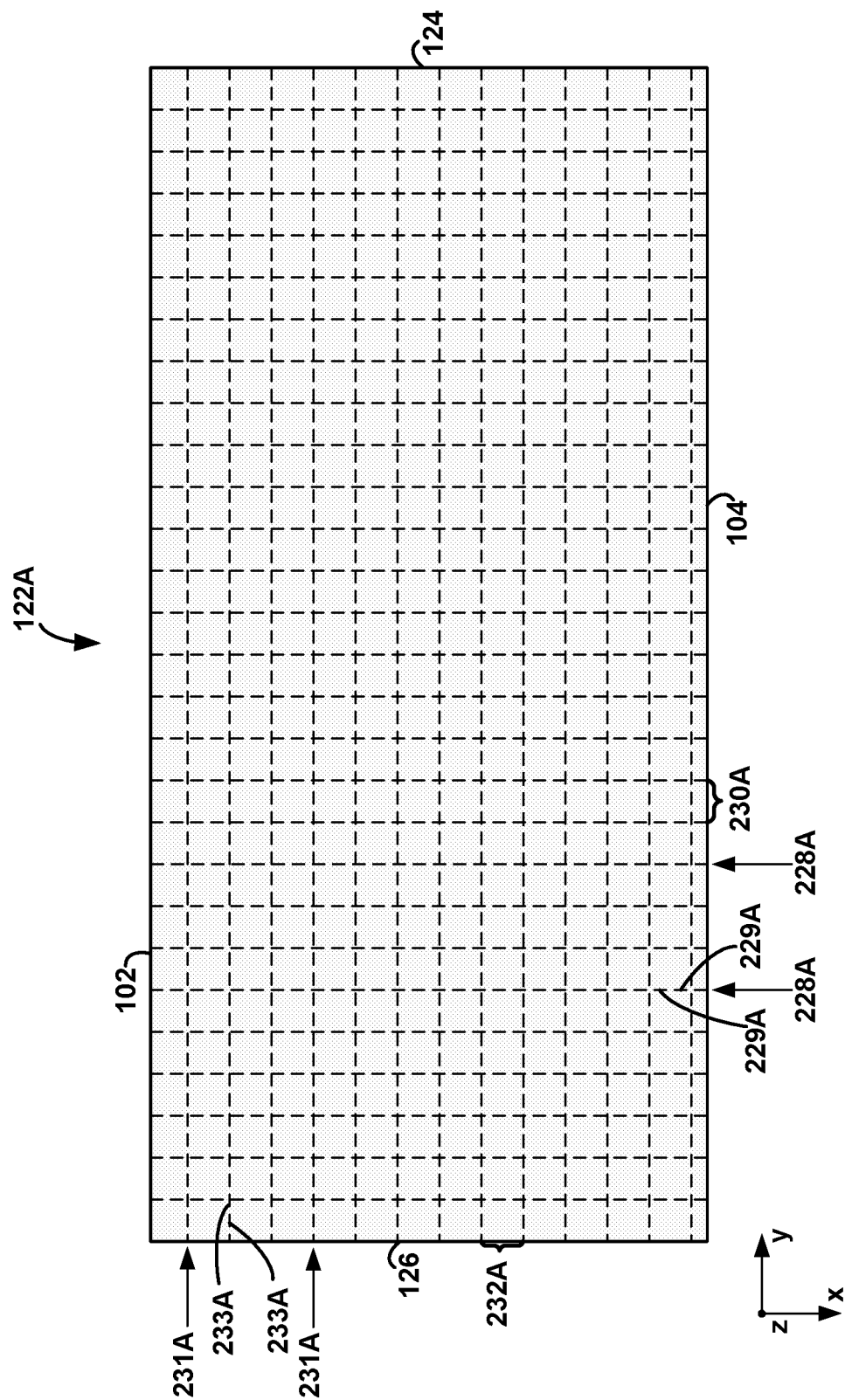
FIG. 6 is a cross-sectional view of a plaster board depicting a liner according to another embodiment of the disclosure.

FIG. 6 shows an embodiment of the liner 122 shown in FIG. 1, namely, the liner 122A. The liner 122A includes structurally weakened regions 228A that extend from the edge 102 to the edge 104 of the plaster board 100. In some examples, the structurally weakened regions of the second liner might only span a fraction most of the distance between the first edge and the second edge of the plaster board.

In certain embodiments, at least one structurally weakened region of the one or more structurally weakened regions of the second liner is a discontinuous perforation (e.g., a row of perforations), taking the form of a dashed or dotted line, for example. As shown in FIG. 6, the structurally weakened regions 228A take the form of dashed lines that extend between the edges 102 and 104. Additionally, at least one structurally weakened region of the second liner is formed as a row of holes in the second liner. For example, one or more of the structurally weakened regions 228A may include several holes 229A aligned in a row. Additionally or alternatively, such holes may take the form of rounded holes, polygonal holes, and/or point holes in the second liner.

Figure 7:
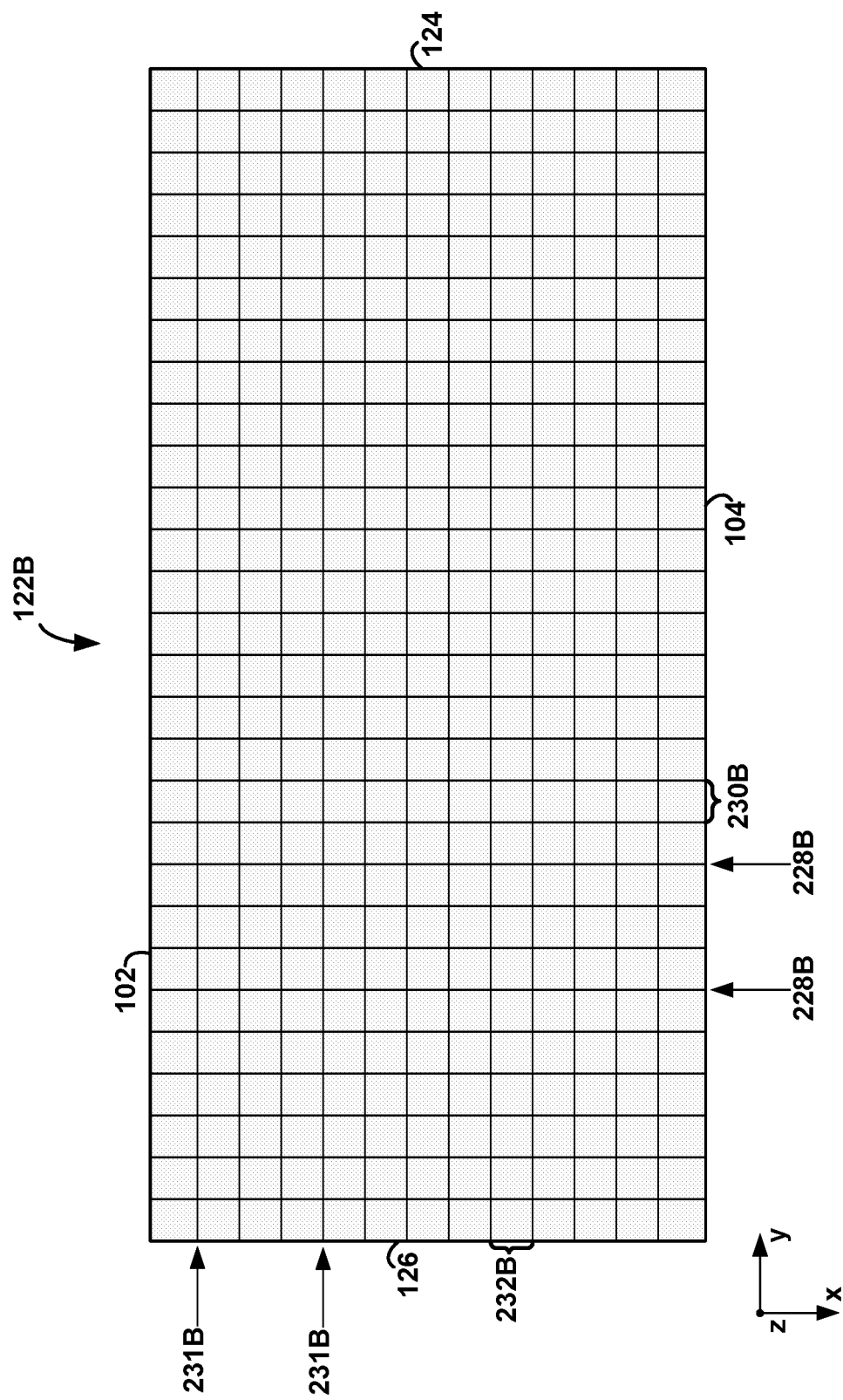
FIG. 7 is a cross-sectional view of a plaster board depicting a liner according to another embodiment of the disclosure.

Also, at least one structurally weakened region of the one or more structurally weakened regions of the second liner may include a substantially continuous perforation. For instance, FIG. 7 depicts an alternative embodiment of the liner 122, the liner 122B, in which the structurally weakened regions 228B each take the form of substantially continuous perforations that span the entirety of the distance between the edge 102 and the edge 104.

In certain embodiments, the one or more structurally weakened regions of the second liner include a first plurality of structurally weakened regions arranged substantially parallel to one another. As shown in FIG. 6, the structurally weakened regions 228A are arranged in parallel with one another and extend between the edges 102 and 104. Additionally, as shown in FIG. 7, the structurally weakened regions 228B are arranged in parallel with one another and extend between the edges 102 and 104.

The first plurality of structurally weakened regions of the second liner may be separated from one another by a distance that is substantially equal to 0.0625 inches, 0.125 inches, 0.25 inches, or 0.5 inches.

As shown in FIG. 6, the structurally weakened regions 228A are separated from one another by distances 230A that can be substantially equal to 0.0625 inches, 0.125 inches, 0.25 inches, 0.5 inches, or any other suitable distance. Similarly, as shown in FIG. 7, the structurally weakened regions 228B are separated from one another by distances 230B that can be substantially equal to 0.0625 inches, 0.125 inches, 0.25 inches, 0.5 inches, or any other suitable distance.

The one or more structurally weakened regions of the second liner may further include a second plurality of structurally weakened regions arranged substantially parallel to one another and each extending substantially from the third edge to the fourth edge of the plaster board. The second plurality of structurally weakened regions of the second liner may each be substantially perpendicular to the first plurality of structurally weakened regions of the second liner.

As shown in FIG. 6, the structurally weakened regions 231A of the liner 122A are parallel to one another and perpendicular to the structurally weakened regions 228A. Also, the structurally weakened regions 231A extend from the edge 124 to the edge 126 and are separated from one another by distances 232A that can be substantially equal to 0.0625 inches, 0.125 inches, 0.25 inches, 0.5 inches, or any other suitable distance. As similarly shown in FIG. 7, the structurally weakened regions 231B of the liner 122B are parallel to one another and perpendicular to the structurally weakened regions 228B. Also, the structurally weakened regions 231B extend from the edge 124 to the edge 126 and are separated from one another by distances 232B that can be substantially equal to 0.0625 inches, 0.125 inches, 0.25 inches, 0.5 inches, or any other suitable distance.

In particular embodiments, the first plurality of structurally weakened regions of the second liner and the second plurality of structurally weakened regions of the second liner are formed as a two-dimensional array of holes formed in the second liner. In some embodiments, the first plurality of structurally weakened regions of the second liner and the second plurality of structurally weakened regions of the second liner form a checkerboard pattern. In particular embodiments, one or more of the first plurality and/or the second plurality of structurally weakened regions of the second liner are separated from each other by respective distances that are substantially equal to each other or by respective randomly determined distances.

Figure 8:
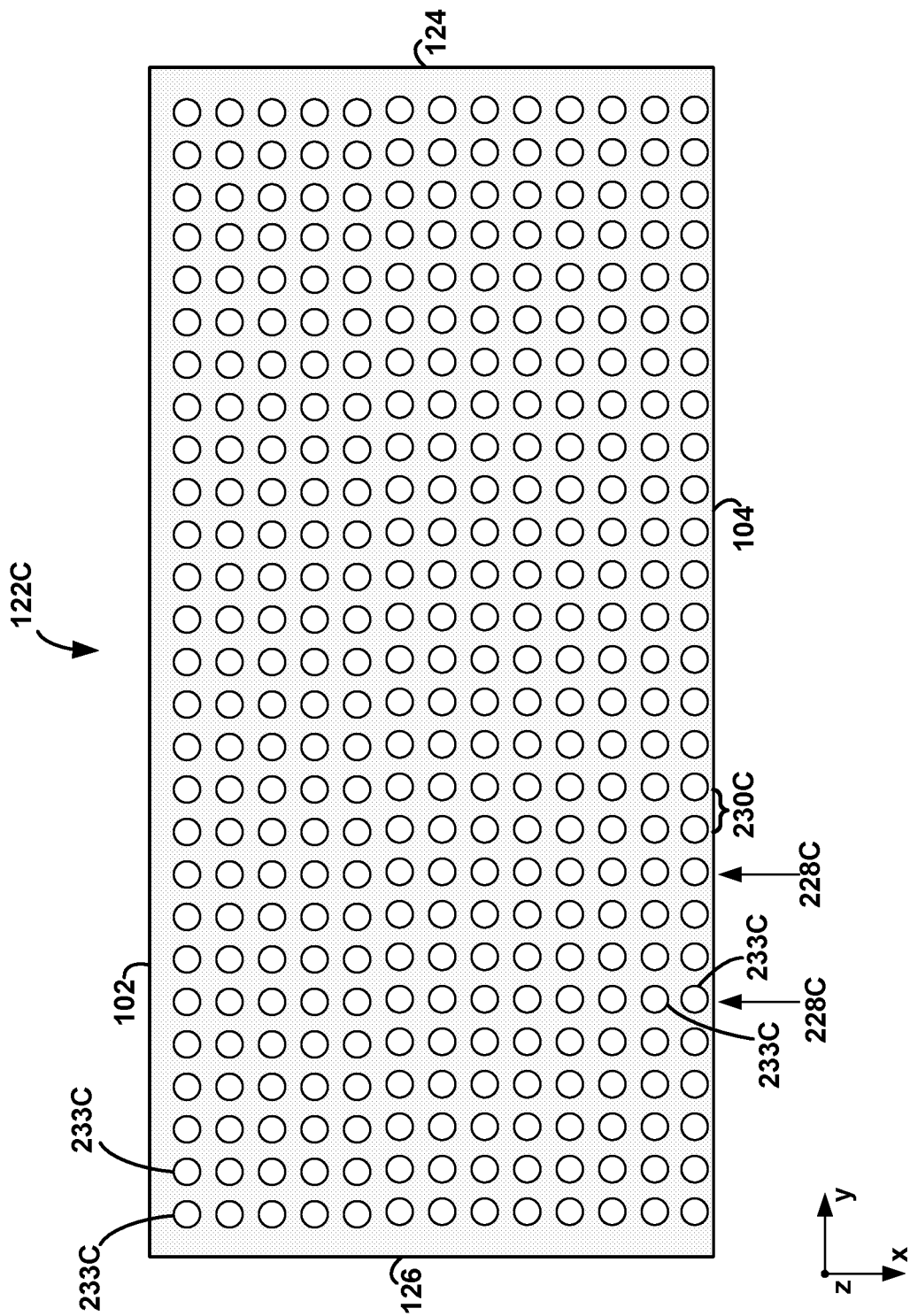
FIG. 8 is a cross-sectional view of a plaster board depicting a liner according to another embodiment of the disclosure.

As shown in FIG. 6, the holes 229A (e.g., dashed lines) of the structurally weakened regions 228A and the holes 233A (e.g., dashed lines) of the structurally weakened regions 231A form a two-dimensional array of holes in the liner 122A. Additionally, the holes 229A and 233A form a checkerboard pattern defined by discontinuous perforations, as shown. In FIG. 8, the holes 233C of the structurally weakened regions 228C of the liner 122C form a two-dimensional array of holes. The liner 122C represents yet another embodiment of the liner 122 shown in FIG. 1.

Figure 9:
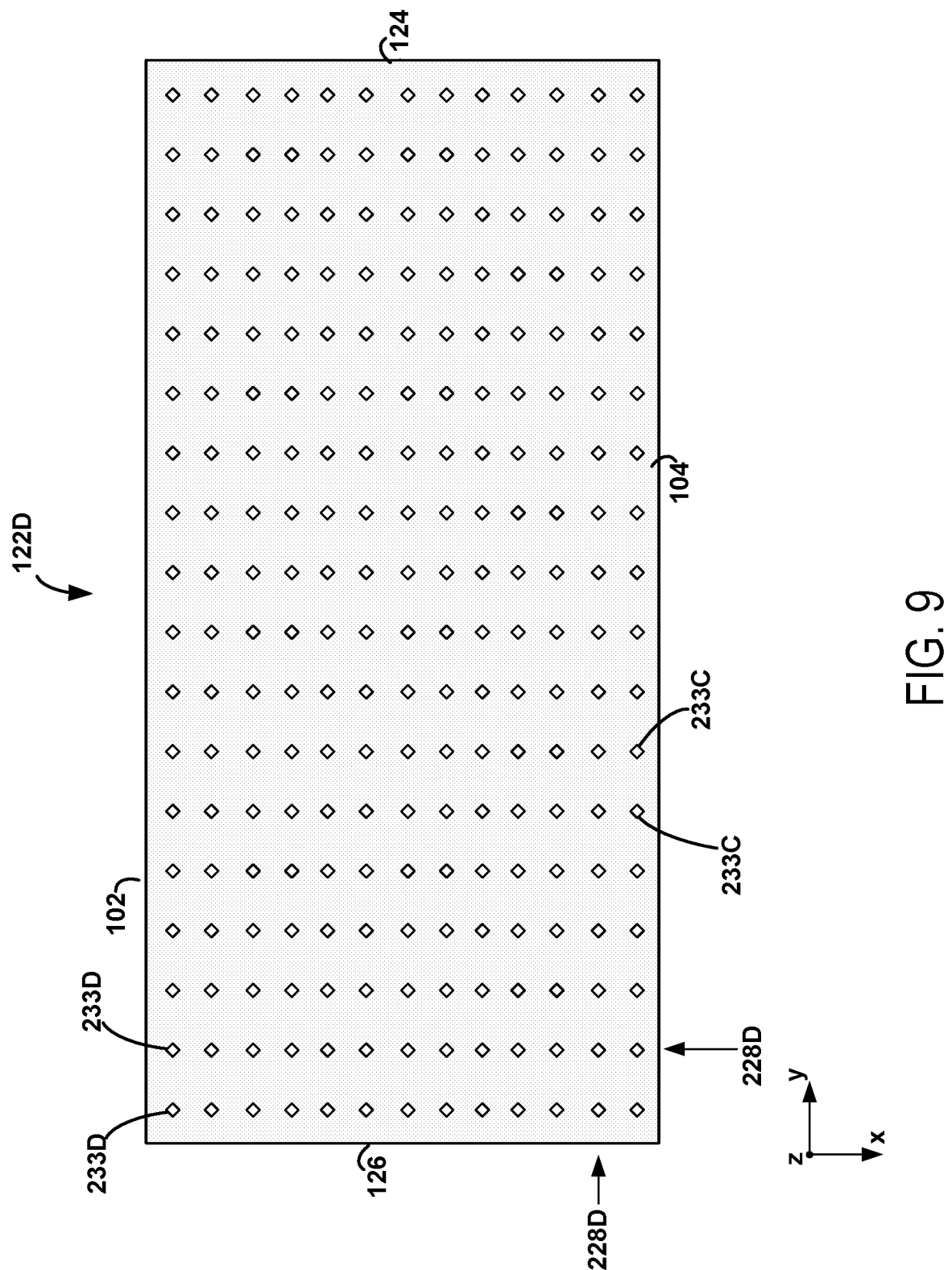
FIG. 9 is a cross-sectional view of a plaster board depicting a liner according to another embodiment of the disclosure.

In some examples, structurally weakened regions within the second liner may be formed as a two-dimensional array of holes that are formed as polygons (e.g., parallelograms such as rectangles, diamonds or squares) having a first diagonal axis along the extension direction of the first plurality of perforations of the second liner and second diagonal axis along the extension direction of the second plurality of perforations of the second liner. See, for example, FIG. 9, in which yet another embodiment of the liner 122 is shown, namely, the liner 122D. In FIG. 9, the structurally weakened regions 228D include rows and columns of square-shaped perforations. The squares are rotationally aligned such that their diagonal axes extend along the directions of the rows and columns. This feature may facilitate the propagation of fissures through the plaster board at areas that are between perforations along the rows and/or columns thereof.

In other examples, such diamond-shaped perforations or portions of the second liner that are defined by such perforations may instead take the shape of one or more of a parallelogram, a rectangle, a diamond, or a square. In various examples, the second liner may have perforated regions having shapes and sizes defined by any number of different polygons.

In particular embodiments, one or more portions of the first layer of hardened plaster material may extend through one or more of the structurally weakened regions of the first liner. Additionally or alternatively, one or more portions of the second layer of hardened plaster material may extend through one or more of the structurally weakened regions of the second liner.

Figure 10:
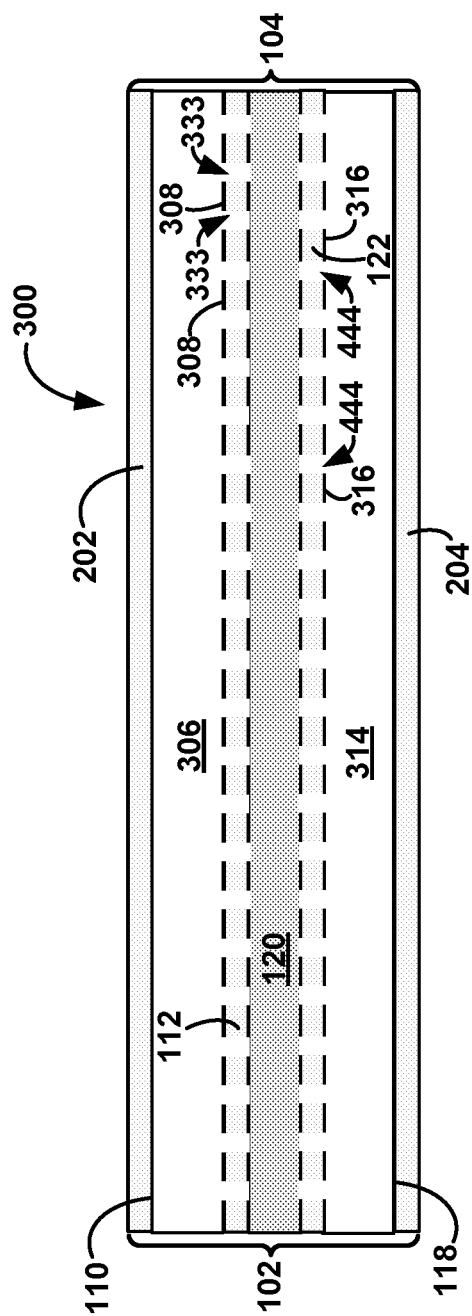
FIG. 10 is a schematic cross-sectional view of a plaster board according to one embodiment of the disclosure.

FIG. 10 depicts an alternative embodiment of a plaster board in the form of the plaster board 300. The plaster board 300 and its components may have any characteristics of the plaster board 100 and its corresponding components, as long as such characteristics are consistent with the variations discussed below.

As shown in FIG. 10, the surface 308 of the layer of hardened plaster material 306 is composed of at least two discontinuous surfaces. The layer of hardened plaster material 306 extends between the surfaces 308, through perforations of the structurally weakened region(s) 333 to contact the first material (e.g., the first polymer material) 120. In some embodiments, portions of the layer of hardened plaster material 306 may extend into the first material (e.g., the first polymer material) 120. In particular embodiments, portions of the layer of hardened plaster material 306 may form a substantially flat surface of hardened plaster material (not shown) disposed between the liner 112 and the first material (e.g., the first polymer material) 120. Similarly, the surface 316 of the layer of hardened plaster material 314 is composed of at least two discontinuous surfaces. The layer of hardened plaster material 314 extends between the surfaces 316, through perforations of the structurally weakened region(s) 444 to contact the first material (e.g., the first polymer material) 120. In some embodiments, portions of the layer of hardened plaster material 314 may extend into the first material (e.g., the first polymer material) 120. In particular embodiments, portions of the layer of hardened plaster material 314 may form a substantially flat surface of hardened plaster material (not shown) disposed between the liner 122 and the first material (e.g., the first polymer material) 120. The extension of the layers of hardened plaster material 306 and 314 through the liners 112 and 122 and/or into the first material (e.g., the first polymer material) 120 may further facilitate the formation of fissures through the plaster board 300.

In the various embodiments shown in FIGS. 1-10, the one or more structurally weakened regions 128A-D, 131A-B, 228A-D, 231A-B, 333, and 444 may each include at least one perforation, e.g., having a depth between 0.003 inches and 0.012 inches, or between 0.005 inches and 0.012 inches, or between 0.01 inches and 0.02 inches, or a perforation substantially equal to 0.01 inches or 0.005 inches or 0.01 inches. In embodiments where the structurally weakened regions take the form of one or more indentions or one or more otherwise incomplete perforations in the corresponding liner, such indentions or incomplete perforations may have a depth between 0.003 inches and 0.012 inches or between 0.005 inches and 0.012 inches, or between 0.01 inches and 0.02 inches into the corresponding liner, or a depth into the corresponding liner that is substantially equal to 0.01 inches or 0.005 inches or 0.01 inches. In embodiments where the structurally weakened regions take the form of one or more complete perforations or "slices" in the corresponding liner, the corresponding liner itself may have a thickness between 0.003 inches and 0.012 inches, or between 0.005 inches and 0.012 inches, or between 0.01 inches and 0.02 inches, or a thickness that is substantially equal to 0.01 inches or 0.005 inches or 0.01 inches.

Figure 11:
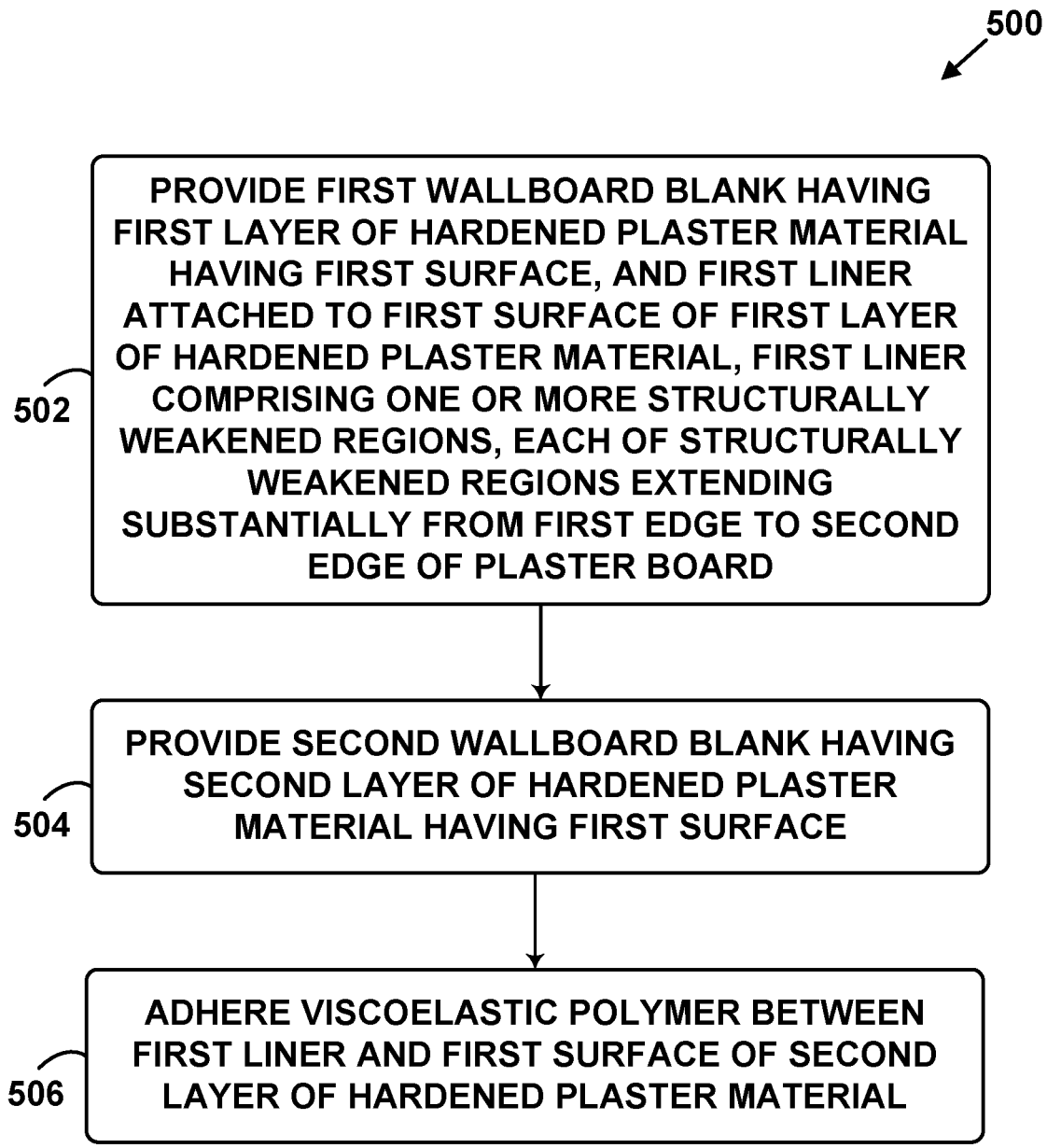
FIG. 11 is a block diagram of a method for making a plaster board according to one embodiment of the disclosure.

FIG. 11 is a block diagram for a method 500 for making a plaster board having a first edge and a second opposing edge. For example, the method 500 could be used to make the plaster board 100 of FIG. 1 or the plaster board 300 of FIG. 10.

At block 502, the method 500 includes providing a first plaster board blank having a first layer of hardened plaster material having a first surface, and a first liner attached to the first surface of the first layer of hardened plaster material. In this context, the first liner includes one or more structurally weakened regions that each extend substantially from the first edge to the second edge of the plaster board.

Figure 12:
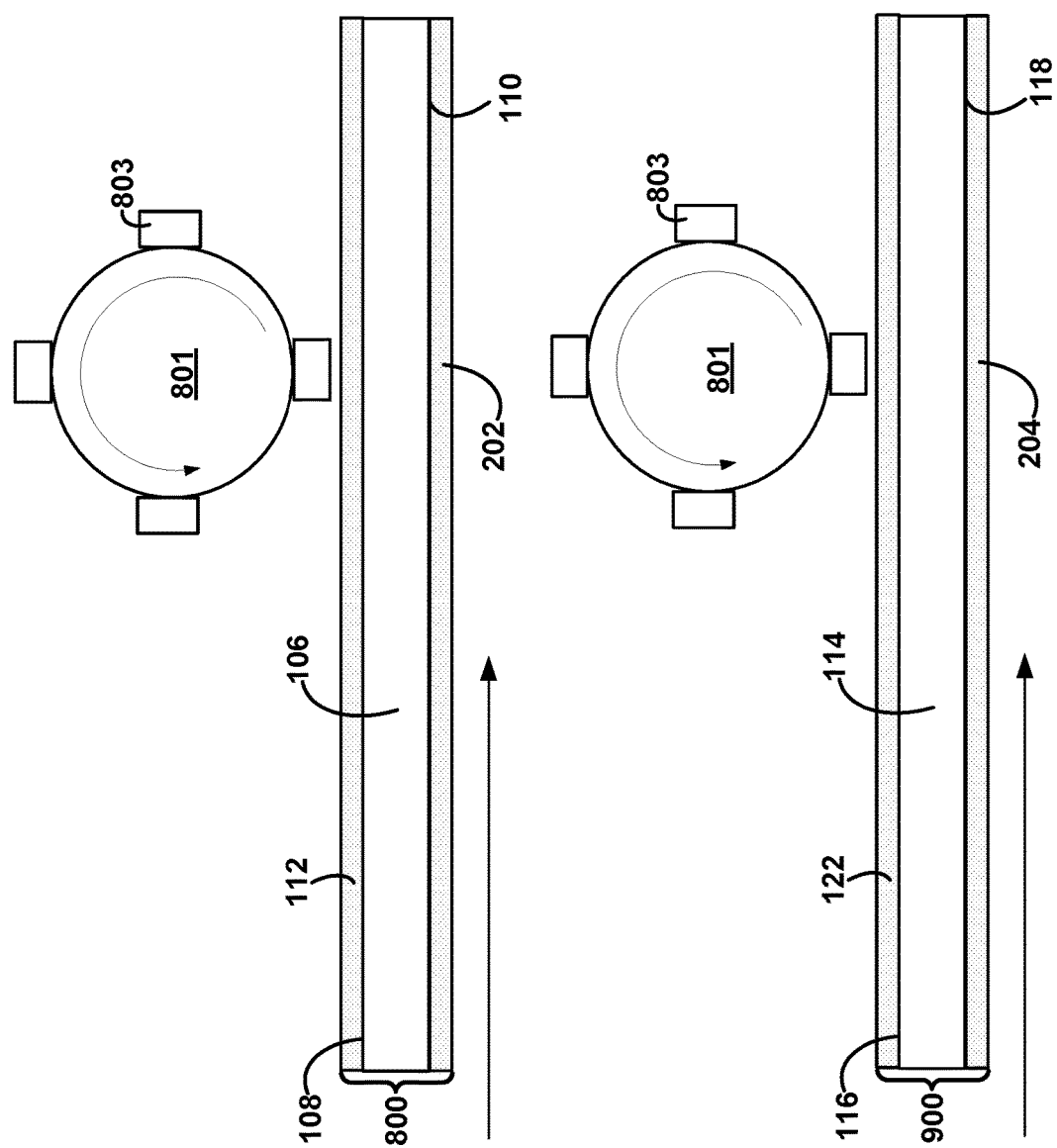
FIG. 12 is a schematic diagram of liners of two plaster board blanks being perforated according to one embodiment of the disclosure.

Referring to FIG. 12, for example, the plaster board blank 800 may include the layer of hardened plaster material 106, the liner 112 that is attached to the surface 108 of the layer of hardened plaster material 106, and the liner 202 that is attached to the surface 110 of the layer of hardened plaster material 106. The plaster board blank 800 may be used to form the plaster board 100 shown in FIG. 1.

In particular embodiments, providing the first plaster board blank includes dispensing a first wet plaster material such that the first wet plaster material is in contact with the first liner having the one or more structurally weakened regions, and drying the first wet plaster material such that the first wet plaster material hardens into the first layer of hardened plaster material and the first liner is attached to the first surface of the first layer of hardened plaster material.

Figure 13:
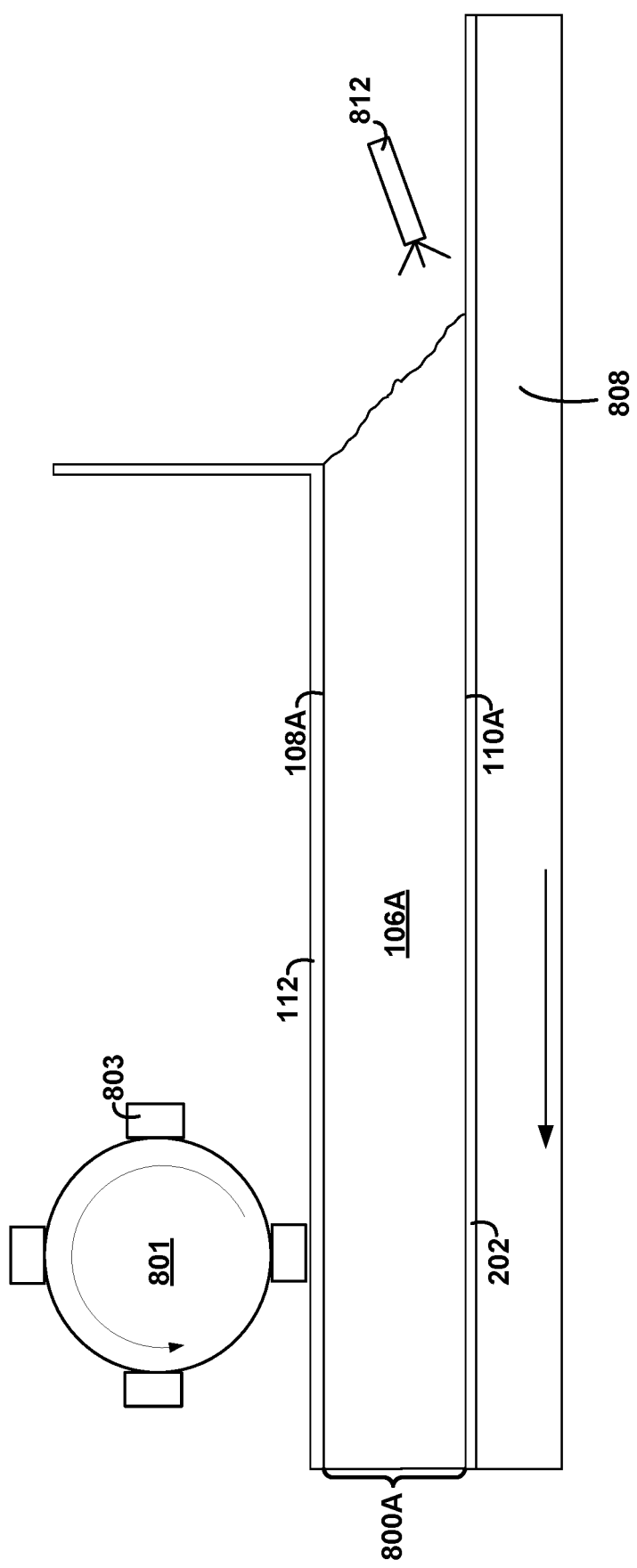
FIG. 13 is a schematic diagram of formation of a plaster board blank according to one embodiment of the disclosure.

Referring to FIG. 13, for example, a wet plaster board precursor 800A is provided. The wet plaster board precursor is a wet body (i.e., with water) that can be dried to provide a plaster board as described above. It includes a wet plaster material 106A extending from a surface 108A of the wet plaster board precursor 800A to a surface 110A of the wet plaster board precursor 800A. The wet plaster material 106A is a wet, formable plaster material that can harden to provide the hardened plaster material 106, shown in FIGS. 1 and 12. The wet plaster material can be, for example, a gypsum slurry, or a slurry (i.e., when the hardened plaster material is a gypsum material). In other embodiments, the wet plaster material is a wet lime material or a wet cement material. But the person of ordinary skill in the art will appreciate that a variety of wet plaster materials can be used in the practice of the processes as described herein. The wet plaster material can include any additives or fillers familiar to the person of ordinary skill in the art, including those described above with respect to the hardened plaster material. The wet plaster material is desirably a semiliquid or otherwise formable mixture that can be, for example, dispensed and spread onto a surface such as a platform or conveyer.

In some examples, providing the wet plaster board precursor 800A may involve dispensing the wet plaster material 106A onto a platform 808. The platform 808 may be a stationary platform like a table in some examples. In other examples, the platform 808 may take the form of a moving conveyer and providing the wet plaster board precursor 800A may involve dispensing the wet plaster material 106A onto the conveyer as the conveyer moves from right to left (e.g., with reference to FIG. 13). As the person of ordinary skill in the art will appreciate, a length of paper, fiberglass mat or fabric, or other backing material (e.g., the liner 202) may be disposed on the platform, such that the wet plaster material 106A is dispensed on and spread onto the backing material. In such embodiments, the paper, fiberglass or other backing material will remain at the surfaces of the plaster board, as is conventional for plaster board materials.

In the embodiment of FIG. 13, the liner 202 is disposed on the platform 808 (here, a conveyer travelling from right to left as indicated by the arrow). The wet plaster material 106A is dispensed on the liner 202 (i.e., on the platform 808) via dispenser 812. Finally, the liner 112 can be disposed on the wet plaster material 106A. Thus, the wet plaster board precursor 800A includes the wet plaster material 106A disposed between the liners 202 and 112. In this example, the wet plaster material 106A is in contact with the liner 112 already having the one or more structurally weakened regions, as described above with reference to FIGS. 2-5.

Next, the wet plaster material 106A may be allowed to harden and/or dry to form the layer of hardened plaster material 106 of the plaster board blank 800 of FIG. 12 (e.g., the plaster board 100 of FIG. 1). The wet plaster material 106A can be heated (e.g., via an oven or a radiant heater) and/or generate its own heat via an exothermic reaction. And the heat applied or generated during the drying process is desirably sufficient to cure and harden the body of wet plaster material to form the body of hardened plaster material as described above. Accordingly, during the hardening process, the wet plaster board precursor is desirably at a temperature in excess of 70° C. for at least 20 minutes. If the heat formed by the hardening of the plaster material is insufficient, the wet plaster board precursor can be at a temperature between 70° C. and 130° C. for a duration of at least 20 minutes.

In certain embodiments, providing the first plaster board blank includes dispensing a first wet plaster material such that the first wet plaster material is in contact with the first liner, and processing the first liner while the first wet plaster material is in contact with the first liner to form the one or more structurally weakened regions of the first liner, and drying the first wet plaster material such that the first wet plaster material hardens into the first layer of hardened plaster material and the first liner is attached to the first surface of the first layer of hardened plaster material.

For example, the wet plaster material 106A can be dispensed onto the liner 202 (i.e., the platform 808) as described above such that the wet plaster material 106A is in contact with the liner 112, as shown in FIG. 13. Next, the roller 801 having perforating blades 803 is used to process the liner 112 while the liner 112 is in contact with the wet plaster material 106A to form the structurally weakened regions as described above with reference to FIGS. 2-5. Each of the perforating blades may shaped as one or more of a circle, an ellipse, another rounded shape, any polygon, a parallelogram, a rectangle, a diamond, and/or a square. As such, the structurally weakened regions of the first liner may have several different shapes.

In some embodiments, providing the first plaster board blank includes processing the first liner while the first liner is attached to the first surface of the first layer of hardened plaster material to form the one or more structurally weakened regions of the first liner. For example, the liner 112 of the plaster board blank 800 may be processed while the liner 112 is attached to the layer of hardened plaster material 106 to form any of the structurally weakened regions 128A-D or 131A-B, as described above with reference to FIGS. 2-5.

In some examples, processing the first liner includes perforating the first layer of hardened plaster material or forming an indention in the first wet plaster material. Referring to FIG. 13 for instance, the perforating blades 803 may cut or puncture the liner 112, forming complete perforations that make up the structurally weakened regions of the liner 112, as discussed above. Additionally or alternatively, the perforating blades 803 might not completely cut the liner 112, perhaps by varying the depth setting of the blades, but may instead form indentions in the liner 112 to form the structurally weakened regions of the liner 112. Forming complete perforations and/or forming indentions in the liner 112 may be performed before, during, or after the wet plaster material 106A has hardened into the layer of hardened plaster material 106.

At block 504, the method 500 includes providing a second plaster board blank having a second layer of hardened plaster material having a first surface. In certain embodiments, providing the second plaster board blank includes providing the second plaster board blank having a second liner attached to the first surface of the second plaster board blank, the second liner having one or more structurally weakened regions extending substantially from the first edge to the second edge of the plaster board.

Referring to FIG. 12, for example, the plaster board blank 900 may include the layer of hardened plaster material 114, the liner 122 that is attached to the surface 116 of the layer of hardened plaster material 114, and the liner 204 that is attached to the surface 118 of the layer of hardened plaster material 114. The liner 122 may include one or more structurally weakened regions as described above. The plaster board blank 900 may be used to form the plaster board 100 shown in FIG. 1.

In particular embodiments, providing the second plaster board blank includes dispensing a second wet plaster material such that the second wet plaster material is in contact with the second liner having the one or more structurally weakened regions, and drying the second wet plaster material such that the second wet plaster material hardens into the second layer of hardened plaster material and the second liner is attached to the first surface of the second layer of hardened plaster material.

Figure 14:
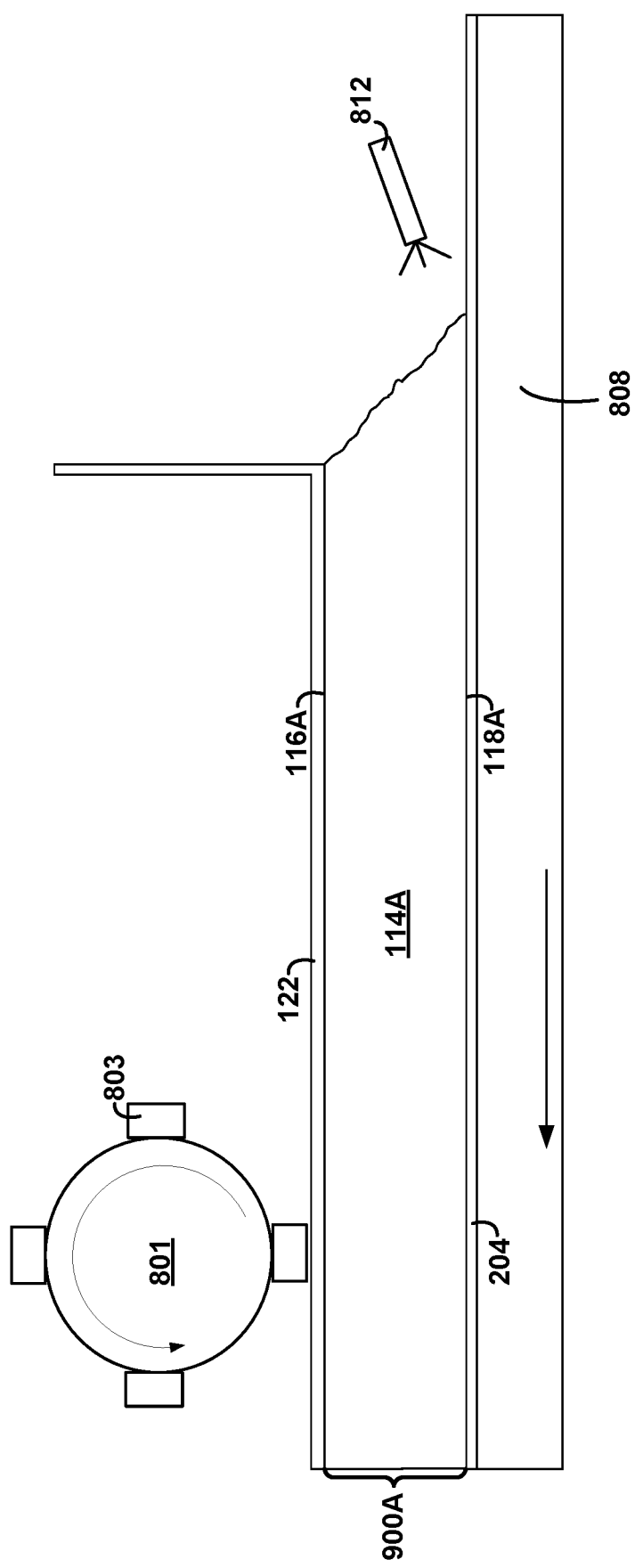
FIG. 14 is a schematic diagram of formation of a plaster board blank according to one embodiment of the disclosure.

Referring to FIG. 14, for example, a wet plaster board precursor 900A is provided. It includes a wet plaster material 114A extending from a surface 116A of the wet plaster board precursor 900A to a surface 118A of the wet plaster board precursor 900A. The wet plaster material 114A is a wet, formable plaster material that can harden to provide the hardened plaster material 114, shown in FIGS. 1 and 12.

In some examples, providing the wet plaster board precursor 900A may involve dispensing the wet plaster material 114A onto the platform 808. The platform 808 may be a stationary platform like a table in some examples. In other examples, the platform 808 may take the form of a moving conveyor and providing the wet plaster board precursor 900A may involve dispensing the wet plaster material 114A onto the conveyor as the conveyor moves from right to left (e.g., with reference to FIG. 14). As the person of ordinary skill in the art will appreciate, a length of paper, fiberglass mat or fabric, or other backing material (e.g., the liner 204) may be disposed on the platform, such that the wet plaster material 114A is dispensed on and spread onto the backing material. In such embodiments, the paper, fiberglass or other backing material will remain at the surfaces of the plaster board, as is conventional for plaster board materials.

In the embodiment of FIG. 14, the liner 204 is disposed on the platform 808 (here, a conveyer travelling from right to left as indicated by the arrow). The wet plaster material 114A is dispensed on the liner 204 (i.e., on the platform 808) via dispenser 812. Finally, the liner 122 can be disposed on the wet plaster material 114A. Thus, the wet plaster board precursor 900A includes the wet plaster material 114A disposed between the liners 204 and 122. In this example, the wet plaster material 114A is in contact with the liner 122 already having the one or more structurally weakened regions, as described above with reference to FIGS. 6-9.

Next, the wet plaster material 114A may be allowed to harden and/or dry to form the layer of hardened plaster material 114 of the plaster board blank 900 of FIG. 12 (e.g., the plaster board 100 of FIG. 1). The wet plaster material 114A can be heated (e.g., via an oven or a radiant heater) and/or generate its own heat via an exothermic reaction.

In certain embodiments, providing the second plaster board blank includes dispensing a second wet plaster material such that the second wet plaster material is in contact with the second liner, and processing the second liner while the second wet plaster material is in contact with the second liner to form the one or more structurally weakened regions of the second liner, and drying the second wet plaster material such that the second wet plaster material hardens into the second layer of hardened plaster material and the second liner is attached to the first surface of the second layer of hardened plaster material.

For example, the wet plaster material 114A can be dispensed onto the liner 204 (i.e., the platform 808) as described above such that the wet plaster material 114A is in contact with the liner 122, as shown in FIG. 14. Next, the roller 801 having perforating blades 803 is used to process the liner 122 while the liner 122 is in contact with the wet plaster material 114A to form the structurally weakened regions as described above with reference to FIGS. 6-9. Each of the perforating blades may shaped as one or more of a circle, an ellipse, another rounded shape, any polygon, a parallelogram, a rectangle, a diamond, and/or a square. As such, the structurally weakened regions of the second liner may have several different shapes.

In some embodiments, providing the second plaster board blank includes processing the second liner while the second liner is attached to the first surface of the second layer of hardened plaster material to form the one or more structurally weakened regions of the second liner. For example, the liner 122 of the plaster board blank 900 may be processed while the liner 122 is attached to the layer of hardened plaster material 114 to form any of the structurally weakened regions 228A-D or 231A-B, as described above with reference to FIGS. 6-9.

In some examples, processing the second liner includes perforating the second layer of hardened plaster material or forming an indention in the second wet plaster material. Referring to FIG. 14 for instance, the perforating blades 803 may cut or puncture the liner 122, forming complete perforations that make up the structurally weakened regions of the liner 122, as discussed above. Additionally or alternatively, the perforating blades 803 might not completely cut the liner 122, perhaps by varying the depth setting of the blades, but may instead form indentions in the liner 122 to form the structurally weakened regions of the liner 122. Forming complete perforations and/or forming indentions in the liner 122 may be performed before, during, or after the wet plaster material 114A has hardened into the layer of hardened plaster material 114.

At block 506, the method 500 includes adhering a first material (e.g., a first polymer material) between the first liner and the first surface of the second layer of hardened plaster material. For example, the first material (e.g., the first polymer material) may be adhered to both the first and second liners, as shown in FIG. 1 and described above. In other examples, the second liner may be absent from the plaster board and the first material (e.g., the first polymer material) is adhered to the first liner and to the first surface of the second layer of hardened plaster material.

In some embodiments, providing the second plaster board blank includes removing a liner from the first surface of the second layer of hardened plaster material to expose the first surface of the second layer of hardened plaster material. For example, the liner 122 may be removed from the surface 116 of the layer of hardened plaster material 114 via sanding or other abrasive methods.

In particular embodiments, dispensing the second wet plaster material includes causing a portion of wet plaster material to seep through at least one of the one or more structurally weakened regions of the second liner to form a layer of wet plaster material on a surface of the second liner that faces away from the second layer of wet plaster material. Some embodiments include dispensing a layer of wet plaster material on a surface of the second liner that faces away from the second layer of wet plaster material.

Figure 15:
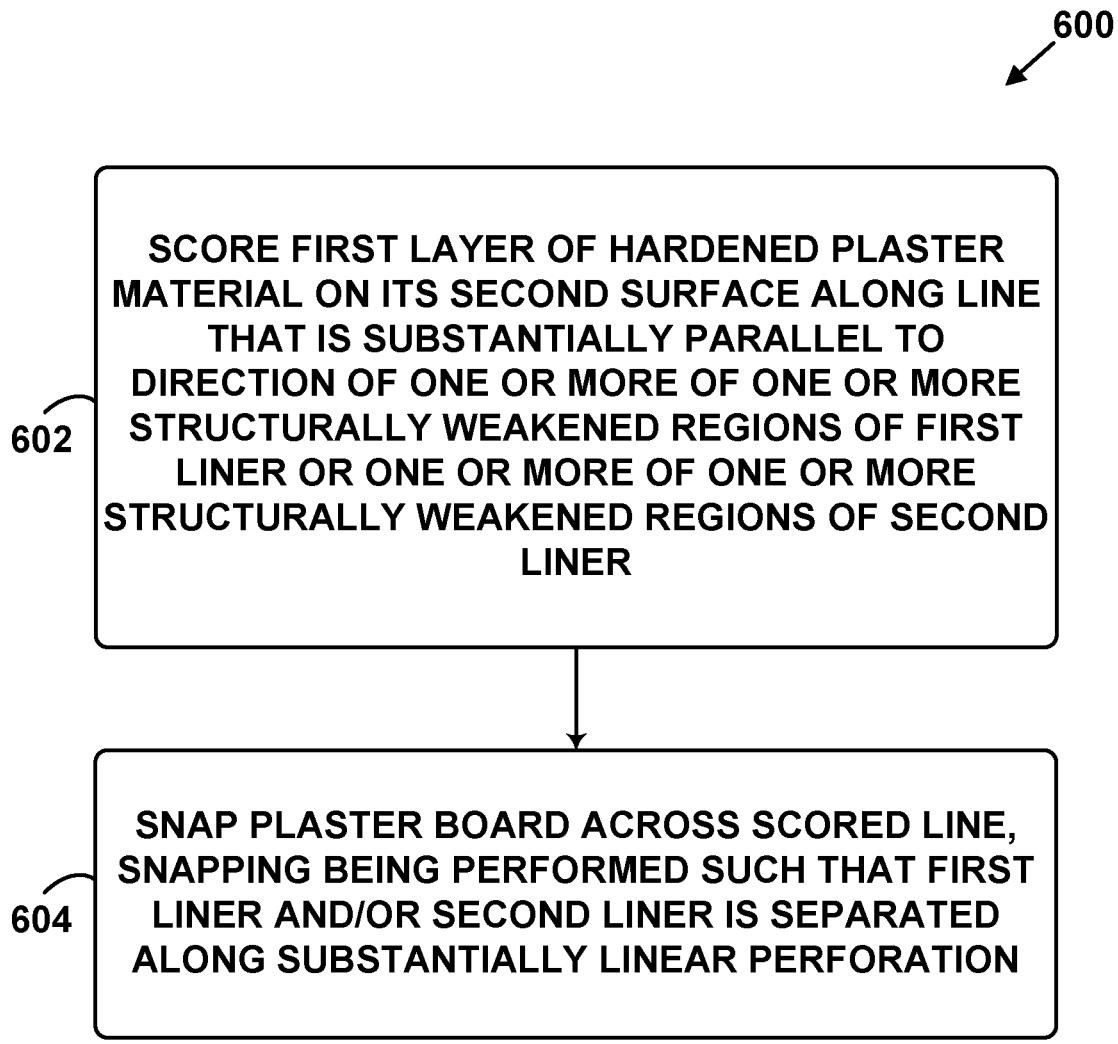
FIG. 15 is a block diagram of a method for forming a planar fissure in a plaster board according to one embodiment of the disclosure.

FIG. 15 is a block diagram of a method 600 for forming a planar fissure in a plaster board. For example, the method 600 can be used to form a planar fissure in the plaster boards 100 or 300.

At block 602, the method 600 includes scoring the first layer of hardened plaster material on its second surface along a line that passes over one or more of the one or more structurally weakened regions of the first liner or one or more of the one or more structurally weakened regions of the second liner.

Figure 16:
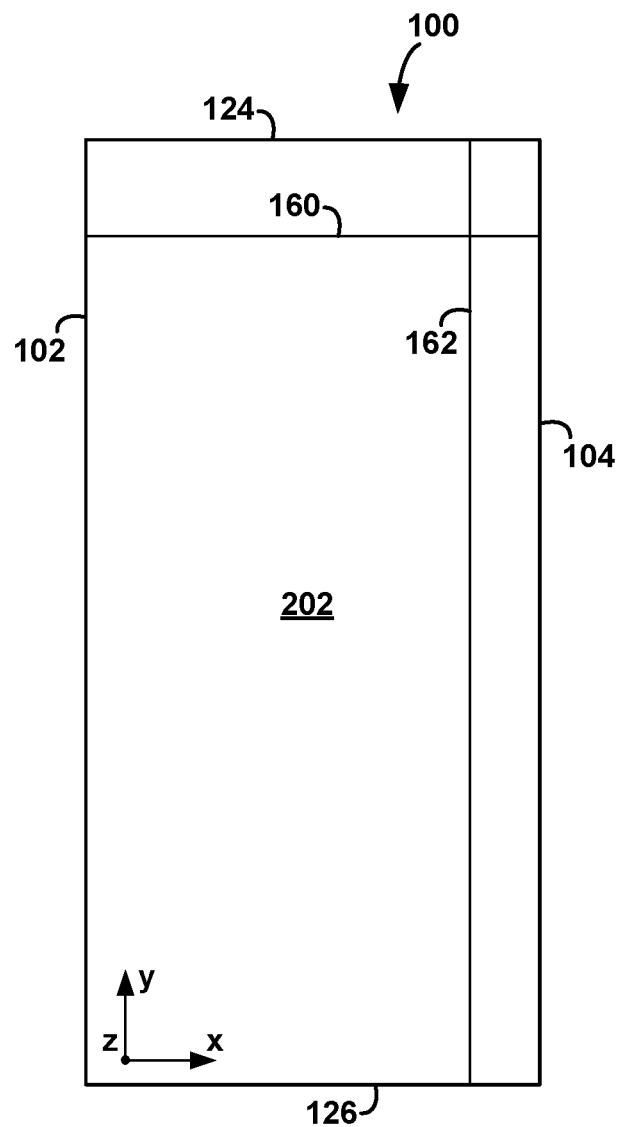
FIG. 16 is a schematic diagram of two lines scored through a liner and into a surface of a plaster board according to one embodiment of the disclosure.

Referring to FIG. 16 for example, an installer may use a utility knife or another tool to score (e.g., make an incision on) the layer of hardened plaster material 106 (not shown) through the liner 202 along the line 160. Referring to FIGS. 2-9, the line 160 may be substantially parallel (e.g., within +/−10 degrees of parallel) to one of the structurally weakened regions 128A-D of the liners 112A-D or one of the structurally weakened regions of 228A-D of the liners 122A-D, for example.

Additionally or alternatively, the installer may score the layer of hardened plaster material 106 through the liner 202 along the line 162. Referring to FIGS. 2-9, the line 162 may be substantially parallel (e.g., within +/−10 degrees of parallel) to one of the structurally weakened regions 131A-B of the liners 112A-B, a horizontal row of holes 133C in the liner 112C, one of the structurally weakened regions 231A-B of the liners 122A-B, or a horizontal row of holes 233C of the liner 122C.

At block 604, the method 600 includes snapping the plaster board across the scored line, the snapping being performed such that the first liner and/or the second liner is separated along a substantially linear perforation.

Figure 17:
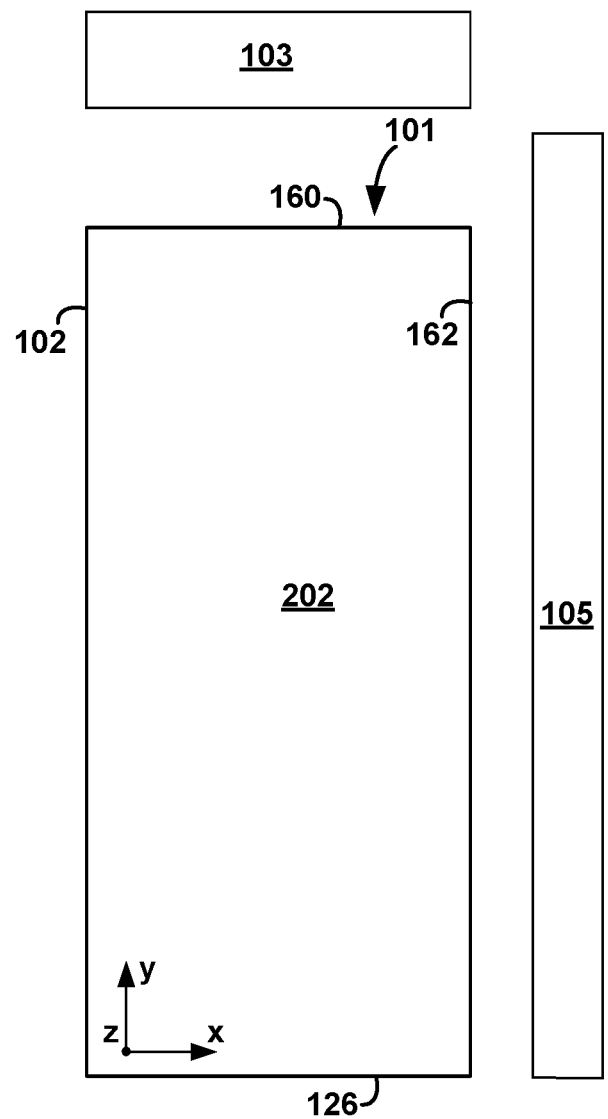
FIG. 17 is a schematic diagram of the plaster board of FIG. 16 snapped into fragments according to one embodiment of the disclosure.

Referring to FIG. 17 for example, an installer may snap the plaster board 100 across the line 160 and the line 162 to form a smaller plaster board 101 and board fragments 103 and 105. The lines 160 and/or 162 may form edges of the new plaster board 101. Referring to FIGS. 2-5, any of the structurally weakened regions 128A-D may be substantially parallel to the line 160, thus facilitating a substantially planar fissure of the plaster board 100 to form the plaster board 101 and the board fragment 103. Similarly, any of the structurally weakened regions 228A-D may be substantially parallel to the line 160, thus facilitating a substantially planar fissure of the plaster board 100 to form the plaster board 101 and the board fragment 103. Also, any of the structurally weakened regions 131A-B or 231A-B or horizontal rows of holes 133C or 233C may be substantially parallel to the line 162, thus facilitating a substantially planar fissure of the plaster board 100 to form the plaster board 101 and the board fragment 105.

Figure 18:
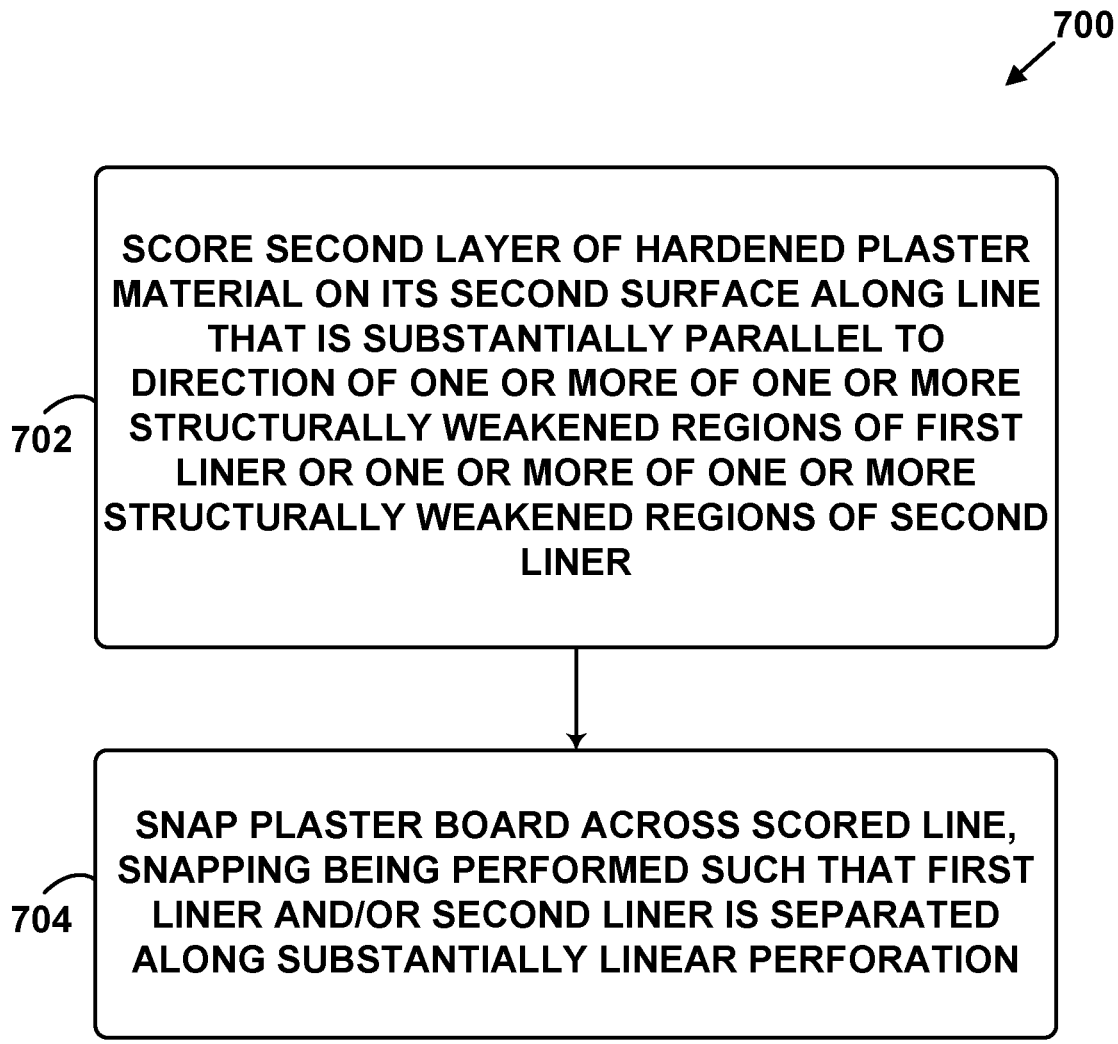
FIG. 18 is a block diagram of a method for forming a planar fissure in a plaster board according to one embodiment of the disclosure.

FIG. 18 is a block diagram of a method 700 for forming a planar fissure in a plaster board. For example, the method 700 can be used to form a planar fissure in the plaster boards 100 or 300.

At block 702, the method 700 includes scoring the second layer of hardened plaster material on its second surface along a line that passes over one or more of the one or more structurally weakened regions of the first liner or one or more of the one or more structurally weakened regions of the second liner.

Figure 19:
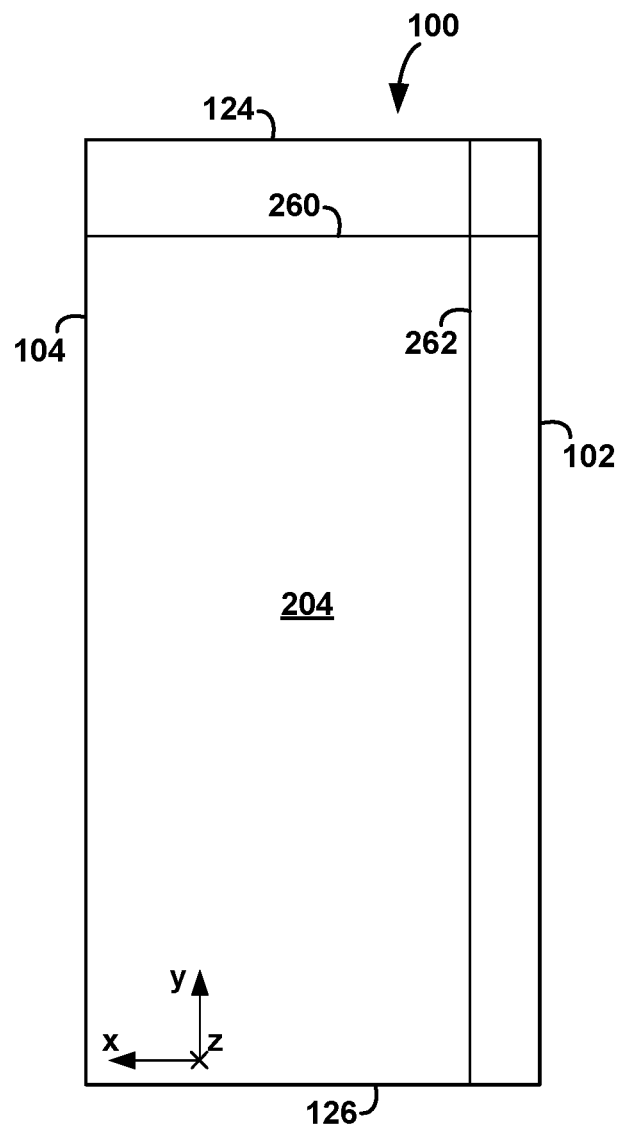
FIG. 19 is a schematic diagram of two lines scored through a liner and into a surface of a plaster board according to one embodiment of the disclosure.

Referring to FIG. 19 for example, an installer may use a utility knife or another tool to score (e.g., make an incision on) the layer of hardened plaster material 114 (not shown) through the liner 204 along the line 260. Referring to FIGS. 2-9, the line 260 may be substantially parallel (e.g., within +/−10 degrees of parallel) to one of the structurally weakened regions 128A-D of the liners 112A-D or one of the structurally weakened regions of 228A-D of the liners 122A-D, for example.

Additionally or alternatively, the installer may score the layer of hardened plaster material 114 through the liner 204 along the line 262. Referring to FIGS. 2-9, the line 262 may be substantially parallel (e.g., within +/−10 degrees of parallel) to one of the structurally weakened regions 131A-B of the liners 112A-B, a horizontal row of holes 133C in the liner 112C, one of the structurally weakened regions 231A-B of the liners 122A-B, or a horizontal row of holes 233C of the liner 122C.

At block 704, the method 700 includes snapping the plaster board across the scored line, the snapping being performed such that the first liner and/or the second liner is separated along a substantially linear perforation.

Figure 20:
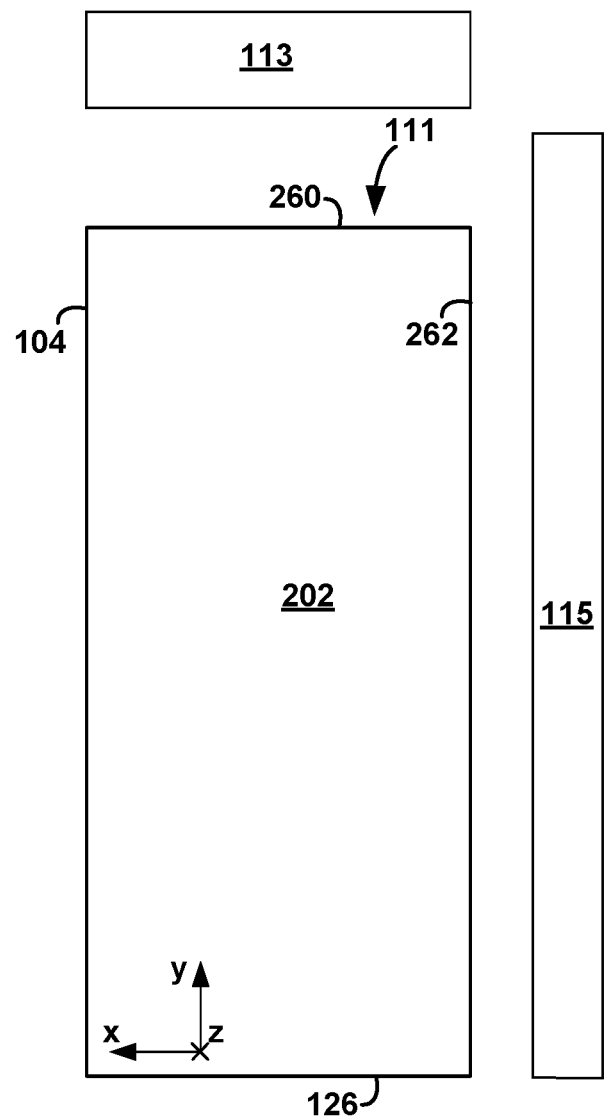
FIG. 20 is a schematic diagram of the plaster board of FIG. 19 snapped into fragments according to one embodiment of the disclosure.

Referring to FIG. 20 for example, an installer may snap the plaster board 100 across the line 260 and the line 262 to form a smaller plaster board 111 and board fragments 113 and 115. The lines 260 and/or 262 may form edges of the new plaster board 111. Referring to FIGS. 2-5, any of the structurally weakened regions 128A-D may be substantially parallel to the line 260, thus facilitating a substantially planar fissure of the plaster board 100 to form the plaster board 111 and the board fragment 113. Similarly, any of the structurally weakened regions 228A-D may be substantially parallel to the line 260, thus facilitating a substantially planar fissure of the plaster board 100 to form the plaster board 111 and the board fragment 113. Also, any of the structurally weakened regions 131A-B or 231A-B or horizontal rows of holes 133C or 233C may be substantially parallel to the line 262, thus facilitating a substantially planar fissure of the plaster board 100 to form the plaster board 111 and the board fragment 115.

Example

As a demonstration of certain aspects of the disclosure, test boards were prepared. Blank quarter-inch paper-clad gypsum wallboard samples were cut into 8"×6" pieces. One paper liner face of each wallboard piece was perforated by hand using a linear cutter, in the pattern of a grid with 1/16" spacing. Samples were made with two different perforation depth: 0.005" and 0.01". Layered boards were made by layering 15 g/ft² of viscoelastic polymer glue between two such wallboard samples having the same perforation depth, weighing down the stacked materials and curing for at least 24 hours. Each sample was scored twice along the same line, then snapped, using the conventional method in the art. Notably, when the scored line was parallel to the perforations, the layered board tended to snap cleanly through both layers of gypsum along the same line (although in some cases that line would jump between perforations, apparently seeking the weakest region of the hand-cut liner. When the scored line was diagonal to the perforations, the two different gypsum layers tended to break along different lines, to provide a stair-step break.

Additional aspects of the disclosure are provided by the numbered embodiments provided below, which can be combined in any logically and technically consistent fashion.

Embodiment 1. A plaster board having a first edge and a second opposing edge, the plaster board comprising:
- a first layer of hardened plaster material comprising a first surface and an opposed second surface,
- a first liner that is attached to the first surface of the first layer of hardened plaster material, wherein the first liner comprises one or more structurally weakened regions, each of the structurally weakened regions extending substantially from the first edge to the second edge of the plaster board,
- a second layer of hardened plaster material comprising a first surface and an opposed second surface, and
- a first material adhered between the first liner and the first surface of the second layer of hardened plaster material.

Embodiment 2. The plaster board of embodiment 1, wherein the first liner comprises fiberglass, plastic, thermoplastic, and/or paper.

Embodiment 3. The plaster board of any of embodiments 1-2, wherein each of the one or more structurally weakened regions of the first liner extends at least 80%, at least 90%, or at least 95% of the distance from the first edge of the plaster board to the second edge of the plaster board.

Embodiment 4. The plaster board of any of embodiments 1-3, wherein at least one structurally weakened region of the one or more structurally weakened regions of the first liner is a perforation.

Embodiment 5. The plaster board of embodiment 4, wherein the at least one structurally weakened region of the one or more structurally weakened regions comprises a discontinuous perforation.

Embodiment 6. The plaster board of embodiment 5, wherein the at least one structurally weakened region is formed as a row of holes in the first liner.

Embodiment 7. The plaster board of embodiment 6, wherein the row of holes comprises one or more rounded holes, polygonal holes, and/or point holes in the first liner.

Embodiment 8. The plaster board of any of embodiments 1-4, wherein at least one structurally weakened region of the one or more structurally weakened regions of the first liner comprises a substantially continuous perforation.

Embodiment 9. The plaster board of any of embodiments 1-8, wherein each of the one or more structurally weakened regions of the first liner is separated from another structurally weakened region of the first liner by no more than 0.0625 inches, 0.125 inches, 0.25 inches, or 0.5 inches.

Embodiment 10. The plaster board of any of embodiments 1-9, wherein the one or more structurally weakened regions comprise a first plurality of structurally weakened regions arranged substantially parallel to one another.

Embodiment 11. The plaster board of embodiment 10, wherein one or more of the first plurality of structurally weakened regions of the first liner are separated from each other by respective distances that are substantially equal to each other.

Embodiment 12. The plaster board of embodiment 10, wherein one or more of the first plurality of structurally weakened regions of the first liner are separated from each other by respective randomly determined distances.

Embodiment 13. The plaster board of embodiment 10, wherein the first plurality of structurally weakened regions of the first liner are separated from one another by a distance that is substantially equal to 0.0625 inches, 0.125 inches, 0.25 inches, or 0.5 inches.

Embodiment 14. The plaster board of any of embodiments 10-13, wherein the first plurality of structurally weakened regions of the first liner include at least 3, at least 5, or at least 10 structurally weakened regions.

Embodiment 15. The plaster board of any of embodiments 10-14, wherein the plaster board has a third edge and an opposing fourth edge, and the one or more structurally weakened regions of the first liner further comprise a second plurality of structurally weakened regions arranged substantially parallel to one another and each extending substantially from the third edge to the fourth edge.

Embodiment 16. The plaster board of embodiment 15, wherein one or more of the second plurality of structurally weakened regions of the first liner are separated from one another by respective distances that are substantially equal to each other.

Embodiment 17. The plaster board of embodiment 15, wherein one or more of the second plurality of structurally weakened regions of the first liner are separated from one another by respective randomly determined distances.

Embodiment 18. The plaster board of any of embodiments 15-17, wherein the third edge and the fourth edge are each substantially perpendicular to the first edge and the second edge.

Embodiment 19. The plaster board of any of embodiments 15-18, wherein the second plurality of structurally weakened regions of the first liner are each substantially perpendicular to the first plurality of structurally weakened regions of the first liner.

Embodiment 20. The plaster board of any of embodiments 15-19, wherein the second plurality of structurally weakened regions of the first liner are separated from one another by a distance that is substantially equal to 0.0625 inches, 0.125 inches, 0.25 inches, or 0.5 inches.

Embodiment 21. The plaster board of any of embodiments 15-20, wherein the second plurality of structurally weakened regions of the first liner include at least 3, at least 5, or at least 10 structurally weakened regions.

Embodiment 22. The plaster board of any of embodiments 15-21, wherein the first plurality of structurally weakened regions of the first liner and the second plurality of structurally weakened regions of the first liner are formed as a two-dimensional array of holes formed in the first liner.

Embodiment 23. The plaster board of embodiment 22, wherein the first plurality of structurally weakened regions and the second plurality of structurally weakened regions form a checkerboard pattern.

Embodiment 24. The plaster board of embodiment 22, wherein the plaster board has a third edge and a fourth edge that are each substantially perpendicular to the first edge and the second edge, wherein the holes are formed as polygons (e.g., parallelograms such as rectangles, diamonds or squares) having a first diagonal axis along the extension direction of the first plurality of perforations of the first liner and second diagonal axis along the extension direction of the second plurality of perforations of the first liner.

Embodiment 25. The plaster board of embodiment 24, wherein the polygons take the form of one or more of a parallelogram, a rectangle, a diamond, or a square, and/or wherein at least one of the polygons has a shape that is different from the other polygons.

Embodiment 26. The plaster board of any of embodiments 1-25, the plaster board further comprising:
 a second liner attached to the first surface of the second layer of hardened plaster material, wherein the second liner comprises one or more structurally weakened regions, each of the structurally weakened regions of the second liner extending substantially from the first edge to the second edge of the plaster board,
 wherein the first material is disposed between the first liner and the second liner.

Embodiment 27. The plaster board of embodiment 26, wherein each of the one or more structurally weakened regions of the second liner extends at least 80%, at least 90%, or at least 95% of the distance from the first edge of the plaster board to the second edge of the plaster board.

Embodiment 28. The plaster board of any of embodiments 26-27, wherein at least one structurally weakened region of the one or more structurally weakened regions of the second liner is a perforation.

Embodiment 29. The plaster board of embodiment 28, wherein the at least one structurally weakened region of the second liner comprises a discontinuous perforation.

Embodiment 30. The plaster board of embodiment 29, wherein the at least one structurally weakened region of the second liner is formed as a row of holes in the second liner.

Embodiment 31. The plaster board of embodiment 30, wherein the row of holes in the second liner comprises one or more rounded holes, polygonal holes, and/or point holes.

Embodiment 32. The plaster board of any of embodiments 26-28, wherein at least one structurally weakened region of the one or more structurally weakened regions of the second liner is a substantially continuous perforation.

Embodiment 33. The plaster board of any of embodiments 26-32, wherein each of the one or more structurally weakened regions of the second liner is separated from another structurally weakened region of the second liner by no more than 0.0625 inches, 0.125 inches, 0.25 inches, or 0.5 inches.

Embodiment 34. The plaster board of any of embodiments 26-33, wherein the one or more structurally weakened regions of the second liner comprise a first plurality of structurally weakened regions arranged substantially parallel to one another.

Embodiment 35. The plaster board of embodiment 34, wherein one or more of the first plurality of structurally weakened regions of the second liner are separated from each other by respective distances that are substantially equal to each other.

Embodiment 36. The plaster board of embodiment 34, wherein one or more of the first plurality of structurally weakened regions of the second liner are separated from each other by respective randomly determined distances.

Embodiment 37. The plaster board of embodiment 34, wherein the first plurality of structurally weakened regions of the second liner are separated from one another by a distance that is substantially equal to 0.0625 inches, 0.125 inches, 0.25 inches, or 0.5 inches.

Embodiment 38. The plaster board of any of embodiments 34-37, wherein the first plurality of structurally weakened regions of the second liner include at least 3, at least 5, or at least 10 perforations.

Embodiment 39. The plaster board of any of embodiments 34-38, wherein the plaster board has a third edge and an opposing fourth edge and the one or more structurally weakened regions of the second liner further comprise a second plurality of structurally weakened regions arranged substantially parallel to one another and each extending substantially from the third edge to the fourth edge.

Embodiment 40. The plaster board of embodiment 39, wherein one or more of the second plurality of structurally weakened regions of the second liner are separated from one another by respective distances that are substantially equal to each other.

Embodiment 41. The plaster board of embodiment 39, wherein one or more of the second plurality of structurally weakened regions of the second liner are separated from one another by respective randomly determined distances.

Embodiment 42. The plaster board of embodiment 39, wherein the third edge and the fourth edge are each substantially perpendicular to the first edge and the second edge.

Embodiment 43. The plaster board of any of embodiments 39-42, wherein the second plurality of structurally weakened regions of the second liner are each substantially perpendicular to the first plurality of structurally weakened regions of the second liner.

Embodiment 44. The plaster board of any of embodiments 39-43, wherein the second plurality of structurally weakened regions of the second liner are separated from one another by a distance that is substantially equal to 0.0625 inches, 0.125 inches, 0.25 inches, or 0.5 inches.

Embodiment 45. The plaster board of any of embodiments 39-44, wherein the second plurality of structurally weakened regions of the second liner include at least 3, at least 5, or at least 10 structurally weakened regions.

Embodiment 46. The plaster board of any of embodiments 39-45, wherein the first plurality of structurally weakened regions of the second liner and the second plurality of structurally weakened regions of the second liner are formed as a two-dimensional array of holes formed in the second liner.

Embodiment 47. The plaster board of embodiment 46, wherein the first plurality of structurally weakened regions of the second liner and the second plurality of structurally weakened regions of the second liner form a checkerboard pattern.

Embodiment 48. The plaster board of embodiment 46, wherein the plaster board has a third edge and a fourth edge that are each substantially perpendicular to the first edge and the second edge, wherein the holes are formed as polygons (e.g., parallelograms such as rectangles, diamonds or squares) having a first diagonal axis along the extension direction of the first plurality of perforations of the second liner and second diagonal axis along the extension direction of the second plurality of perforations of the second liner.

Embodiment 49. The plaster board of embodiment 48, wherein the polygons of the second liner take the form of one or more of a parallelogram, a rectangle, a diamond, or a square and/or wherein at least one of the polygons of the second liner has a shape that is different from the other polygons of the second liner.

Embodiment 50. The plaster board of any of embodiments 1-49, further comprising a third liner on the second surface of the first layer of hardened plaster material, and a fourth liner on the second surface of the second layer of hardened plaster material.

Embodiment 51. The plaster board of any of embodiments 1-50, wherein the one or more structurally weakened regions of the first liner comprise at least two structurally weakened regions having differing shapes and/or differing sizes.

Embodiment 52. The plaster board of any of embodiments 26-50, wherein the one or more structurally weakened regions of the second liner comprise at least two structurally weakened regions having differing shapes and/or differing sizes.

Embodiment 53. The plaster board of any of embodiments 1-52, wherein a portion of the first layer of hardened plaster material extends through at least one of the structurally weakened regions of the first liner that takes the form of a perforation.

Embodiment 54. The plaster board of embodiment 53, wherein the portion of the first layer of hardened plaster material that extends through the at least one of the structurally weakened regions of the first liner forms a substantially flat surface of hardened plaster material disposed between the first liner and the first material.

Embodiment 55. The plaster board of any of embodiments 26-54, wherein a portion of the second layer of hardened plaster material extends through at least one of the structurally weakened regions of the second liner that takes the form of a perforation.

Embodiment 56. The plaster board of embodiment 55, wherein the portion of the second layer of hardened plaster material that extends through the at least one of the structurally weakened regions of the second liner forms a substantially flat surface of hardened plaster material disposed between the second liner and the first material.

Embodiment 57. The plaster board of any of embodiments 1-56, wherein the one or more structurally weakened regions of the first liner comprises at least one perforation having a depth of at least 0.001 inches.

Embodiment 58. The plaster board of any of embodiments 1-56, wherein the one or more structurally weakened regions of the first liner comprises at least one perforation having a depth of at least 0.005 inches, e.g., in the range of 0.005 inches to 0.012 inches.

Embodiment 59. The plaster board of any of embodiments 1-56, wherein the one or more structurally weakened regions of the first liner comprises at least one perforation having a depth of at least 0.01 inches, e.g., in the range of 0.01 inches to 0.02 inches.

Embodiment 60. The plaster board of any of embodiments 1-56, wherein the one or more structurally weakened regions of the first liner comprises at least one perforation having a depth that is substantially equal to 0.01 inches or 0.005 inches or 0.01 inches.

Embodiment 61. The plaster board of any of embodiments 21-60, wherein the one or more structurally weakened regions of the second liner comprises at least one perforation having a depth of at least 0.001 inches.

62. The plaster board of any of embodiments 1-60, wherein the one or more structurally weakened regions of the second liner comprises at least one perforation having a depth of at least 0.005 inches, e.g., in the range of 0.005 inches to 0.012 inches.

Embodiment 63. The plaster board of any of embodiments 1-60, wherein the one or more structurally weakened regions of the second liner comprises at least one perforation having a depth of at least 0.01 inches, e.g., in the range of 0.01 inches to 0.02 inches.

Embodiment 64. The plaster board of any of embodiments 1-60, wherein the one or more structurally weakened regions of the second liner comprises at least one perforation having a depth that is substantially equal to 0.01 inches or 0.005 inches or 0.01 inches.

Embodiment 65. The plaster board of any of embodiments 1-64, wherein the first material is a first polymer material.

Embodiment 66. The plaster board of embodiment 65, wherein the first polymer material is in the form of a polymer layer.

Embodiment 67. The plaster board of embodiment 65, wherein the first polymer material is in the form of a polymer laminate.

Embodiment 68. The plaster board of embodiment 65, wherein the first polymer material is in the form of a polymer disposed on a carrier sheet.

Embodiment 69. The plaster board of any of embodiments 65-68, wherein the first polymer material is a viscoelastic polymer.

Embodiment 70. The plaster board of any of embodiments 1-68, wherein the first polymer material is a foamed polymer.

Embodiment 71. A method for making the plaster board of any of embodiments 1-70, the plaster board having a first edge and a second opposing edge, the method comprising:
  providing a first plaster board blank having a first layer of hardened plaster material having a first surface, and a first liner attached to the first surface of the first layer of hardened plaster material, the first liner comprising one or more structurally weakened regions, each of the structurally weakened regions extending substantially from the first edge to the second edge of the plaster board;
  providing a second plaster board blank having a second layer of hardened plaster material having a first surface; and
  adhering a first material (e.g., a first polymer material) between the first liner and the first surface of the second layer of hardened plaster material.

Embodiment 72. The method of embodiment 71, wherein providing the first plaster board blank comprises
  dispensing a first wet plaster material such that the first wet plaster material is in contact with the first liner having the one or more structurally weakened regions, and
  drying the first wet plaster material such that the first wet plaster material hardens into the first layer of hardened plaster material and the first liner is attached to the first surface of the first layer of hardened plaster material.

Embodiment 73. The method of embodiment 71, wherein providing the first plaster board blank comprises
  dispensing a first wet plaster material such that the first wet plaster material is in contact with the first liner,
  processing the first liner while the first wet plaster material is in contact with the first liner to form the one or more structurally weakened regions of the first liner, and
  drying the first wet plaster material such that the first wet plaster material hardens into the first layer of hardened plaster material and the first liner is attached to the first surface of the first layer of hardened plaster material.

Embodiment 74. The method of embodiment 72 or embodiment 73, wherein dispensing the first wet plaster material comprises causing a portion of wet plaster material to seep through at least one of the one or more structurally weakened regions of the first liner to form a layer of wet plaster material on a surface of the first liner that faces away from the first layer of wet plaster material.

Embodiment 75. The method of embodiment 72 or embodiment 73, further comprising dispensing a layer of wet plaster material on a surface of the first liner that faces away from the first layer of wet plaster material.

Embodiment 76. The method of embodiment 71, wherein providing the first plaster board blank comprises
  processing the first liner while the first liner is attached to the first surface of the first layer of hardened plaster material to form the one or more structurally weakened regions of the first liner.

Embodiment 77. The method of any of embodiments 73-76, wherein processing the first liner comprises mechanically processing the first liner to form the one or more structurally weakened regions of the first liner.

Embodiment 78. The method of any of embodiments 73-77, wherein processing the first liner comprises perforating the first liner with one or more rollers each comprising one or more perforating blades.

Embodiment 79. The method of embodiment 78, wherein at least one of the one or more perforating blades has a round, polygonal, point, parallelogram, rectangle, diamond, or square shape.

Embodiment 80. The method of any of embodiments 73-79, wherein at least one of the one or more structurally weakened regions of the first liner has a shape that is different from the other structurally weakened regions of the first liner.

Embodiment 81. The method of any of embodiments 78-80, wherein perforating the first liner comprises perforating the first layer of hardened plaster material or forming an indention in the first wet plaster material.

Embodiment 82. The method of any of embodiments 73-81, wherein providing the second plaster board blank comprises providing the second plaster board blank having a second liner attached to the first surface of the second plaster board blank, the second liner comprising one or more structurally weakened regions extending substantially from the first edge to the second edge of the plaster board.

Embodiment 83. The method of embodiment 82, wherein providing the second plaster board blank comprises:
  dispensing a second wet plaster material such that the second wet plaster material is in contact with the second liner having the one or more structurally weakened regions, and
  drying the second wet plaster material such that the second wet plaster material hardens into the second layer of hardened plaster material and the second liner is attached to the first surface of the second layer of hardened plaster material.

Embodiment 84. The method of embodiment 82, wherein providing the second plaster board blank comprises
  dispensing a second wet plaster material such that the second wet plaster material is in contact with the second liner,
  processing the second liner while the second wet plaster material is in contact with the second liner to form the one or more structurally weakened regions of the second liner, and
  drying the second wet plaster material such that the second wet plaster material hardens into the second layer of hardened plaster material and the second liner is attached to the first surface of the second layer of hardened plaster material.

Embodiment 85. The method of embodiment 83 or embodiment 84, wherein dispensing the second wet plaster material comprises causing a portion of wet plaster material to seep through at least one of the one or more structurally weakened regions of the second liner to form a layer of wet plaster material on a surface of the second liner that faces away from the second layer of wet plaster material.

Embodiment 86. The method of embodiment 83 or embodiment 84, further comprising dispensing a layer of wet plaster material on a surface of the second liner that faces away from the second layer of wet plaster material.

Embodiment 87. The method of embodiment 82, wherein providing the second plaster board blank comprises
  processing the second liner while the second liner is attached to the first surface of the second layer of hardened plaster material to form the one or more structurally weakened regions of the second liner.

Embodiment 88. The method of any of embodiments 84-87, wherein processing the second liner comprises mechanically processing the second liner to form the one or more structurally weakened regions of the second liner.

Embodiment 89. The method of any of embodiments 84-88, wherein processing the second liner comprises perforating the second liner with one or more rollers each comprising one or more perforating blades.

Embodiment 90. The method of embodiment 89, wherein at least one of the one or more perforating blades that perforate the second liner has a round, polygonal, point, parallelogram, rectangle, diamond, or square shape.

Embodiment 91. The method of any of embodiments 82-90, wherein at least one of the one or more structurally weakened regions of the second liner has a shape that is different from the other structurally weakened regions of the second liner.

Embodiment 92. The method of any of embodiments 89-91, wherein perforating the second liner comprises perforating the second layer of hardened plaster material or forming an indention in the second wet plaster material.

Embodiment 93. The method of any of embodiments 71-92, wherein the first polymer material is adhered to the first liner and to the second liner.

Embodiment 94. The method of any of embodiments 71-93, wherein the first polymer material is adhered to the first liner and to the first surface of the second layer of hardened plaster material.

Embodiment 95. The method of embodiment 94, wherein providing the second plaster board blank comprises removing a liner from the first surface of the second layer of hardened plaster material to expose the first surface of the second layer of hardened plaster material.

Embodiment 96. The method of embodiment 95, wherein the liner is removed abrasively.

Embodiment 97. A method of forming a fissure (e.g., a planar fissure) in a plaster board according to any of embodiments 1-70, the method comprising
  scoring the first layer of hardened plaster material on its second surface along a line that passes over one or more of the one or more structurally weakened regions of the first liner or one or more of the one or more structurally weakened regions of the second liner; and
  snapping the plaster board across the scored line, the snapping being performed such that the first liner and/or the second liner is separated along a substantially linear perforation.

Embodiment 98. A method of forming a fissure (e.g., a planar fissure) in a plaster board according to any of embodiments 1-70, the method comprising
  scoring the second layer of hardened plaster material on its second surface along a line that passes over one or more of the one or more structurally weakened regions of the first liner or one or more of the one or more structurally weakened regions of the second liner; and snapping the plaster board across the scored line, the snapping being performed such that the first liner and/or the second liner is separated along a substantially linear perforation.

It will be apparent to those skilled in the art that various modifications and variations can be made to the processes and systems described here without departing from the scope of the disclosure. Thus, it is intended that the present disclosure cover such modifications and variations of such processes and systems.

What is claimed is:

1. A plaster board having a first edge and a second opposing edge, the plaster board comprising:
a first layer of hardened plaster material comprising a first surface and an opposed second surface,
a first liner that is attached to the first surface of the first layer of hardened plaster material, wherein the first liner comprises a plurality of structurally weakened regions, each of the structurally weakened regions extending substantially from the first edge to the second edge of the plaster board, the first liner having a thickness, each of the structurally weakened regions not extending through the thickness of the liner,
a second layer of hardened plaster material comprising a first surface and an opposed second surface, and
a first viscoelastic polymer material adhered between the first liner and the first surface of the second layer of hardened plaster material.

2. The plaster board of claim 1, wherein each of the one or more structurally weakened regions of the first liner extends at least 90% of the distance from the first edge of the plaster board to the second edge of the plaster board.

3. The plaster board of claim 2, wherein at least one of the structurally weakened regions is a substantially continuous structurally weakened region.

4. The plaster board of claim 1, wherein the one or more structurally weakened regions comprise a first plurality of structurally weakened regions arranged substantially parallel to one another.

5. The plaster board of claim 4, wherein one or more of the first plurality of structurally weakened regions of the first liner are separated from each other by respective distances that are substantially equal to each other.

6. The plaster board of claim 4, wherein the plaster board has a third edge and an opposing fourth edge, and the plurality of structurally weakened regions of the first liner further comprise a second plurality of structurally weakened regions arranged substantially parallel to one another and substantially perpendicular to the first plurality of structurally weakened regions, each extending substantially from the third edge to the fourth edge.

7. The plaster board of claim 1, the plaster board further comprising:
a second liner attached to the first surface of the second layer of hardened plaster material, wherein the second liner comprises one or more structurally weakened regions, each of the structurally weakened regions of the second liner extending substantially from the first edge to the second edge of the plaster board,
wherein the first viscoelastic polymer material is disposed between the first liner and the second liner.

8. A method of forming a fissure in a plaster board according to claim 1, the method comprising scoring the second layer of hardened plaster material on its second surface along a line adjacent to and substantially parallel to a first structurally weakened region of the first liner; and snapping the plaster board across the scored line, the snapping being performed such that the first liner is separated along the first substantially linear structurally weakened region thereof.

9. A plaster board having a first edge and a second opposing edge, and a third edge and an opposing fourth edge each perpendicular to the first edge, the plaster board comprising:
a first layer of hardened plaster material comprising a first surface and an opposed second surface,
a first liner that is attached to the first surface of the first layer of hardened plaster material, the first liner extending substantially from the first edge to the second edge and extending substantially from the third edge to the fourth edge, wherein the first liner comprises a plurality of structurally weakened regions, each of the structurally weakened regions extending substantially from the first edge to the second edge of the plaster board, each of the structurally weakened regions being formed as a discontinuous perforation comprising a row of discrete holes formed through the thickness of the first liner and extending in direction from the first edge to the second edge of the plaster board,
a second layer of hardened plaster material comprising a first surface and an opposed second surface, and
a first viscoelastic polymer material adhered between the first liner and the first surface of the second layer of hardened plaster material,
wherein a portion of the first layer of hardened plaster material extends through holes of the structurally weakened regions of the first liner.

10. The plaster board of claim 9, wherein the one or more structurally weakened regions comprise a first plurality of structurally weakened regions arranged substantially parallel to one another, the first plurality of structurally weakened regions of the first liner including at least 10 structurally weakened regions.

11. The plaster board of claim 10, wherein the plaster board has a third edge and an opposing fourth edge, the third edge and the fourth edge being substantially parallel to the first edge and the second edge, and wherein the plurality of structurally weakened regions of the first liner further comprise a second plurality of structurally weakened regions arranged substantially parallel to one another and each extending substantially from the third edge to the fourth edge, and wherein the first plurality of structurally weakened regions of the first liner and the second plurality of structurally weakened regions of the first liner are formed as a two-dimensional array of holes formed in the first liner.

12. The plaster board of claim 11, wherein the holes are formed as polygons having a first diagonal axis along the extension direction of the first plurality of structurally weakened regions of the first liner and a second diagonal axis along the extension direction of the second plurality of structurally weakened regions of the first liner.

13. The plaster board of claim 11, wherein the two-dimensional array is a square grid.

14. A method of forming a fissure in a plaster board according to 9, the method comprising
scoring the second layer of hardened plaster material on its second surface along a line adjacent to and substantially parallel to a first structurally weakened region of the first liner; and snapping the plaster board across the scored line, the snapping being performed such that the first liner is separated along the first substantially linear structurally weakened region thereof.

15. A plaster board having a first edge and a second opposing edge, and a third edge and an opposing fourth edge each perpendicular to the first edge, the plaster board comprising:
- a first layer of hardened plaster material comprising a first surface and an opposed second surface,
- a first liner that is attached to the first surface of the first layer of hardened plaster material, the first liner extending substantially from the first edge to the second edge and extending substantially from the third edge to the fourth edge, wherein the first liner comprises at least 10 structurally weakened regions, each of the structurally weakened regions extending substantially from the first edge to the second edge of the plaster board,
- a second layer of hardened plaster material comprising a first surface and an opposed second surface, and
- a first viscoelastic polymer material adhered between the first liner and the first surface of the second layer of hardened plaster material,
- wherein a portion of the first layer of hardened plaster material extends through holes of the structurally weakened regions of the first liner.

16. The plaster board of claim 15, wherein the at least 10 structurally weakened regions comprise a first plurality of structurally weakened regions arranged substantially parallel to one another.

17. The plaster board of claim 16, wherein one or more of the first plurality of structurally weakened regions of the first liner are separated from each other by respective distances that are substantially equal to each other.

18. The plaster board of claim 16, wherein the plaster board has a third edge and an opposing fourth edge, and the at least 10 structurally weakened regions of the first liner further comprise a second plurality of structurally weakened regions arranged substantially parallel to one another and substantially perpendicular to the first plurality of structurally weakened regions, each extending substantially from the third edge to the fourth edge.

19. The plaster board of claim 15, the plaster board further comprising:
- a second liner attached to the first surface of the second layer of hardened plaster material, wherein the second liner comprises one or more structurally weakened regions, each of the structurally weakened regions of the second liner extending substantially from the first edge to the second edge of the plaster board,
- wherein the first viscoelastic polymer material is disposed between the first liner and the second liner.

20. A method of forming a fissure in a plaster board according to claim 15, the method comprising
- scoring the second layer of hardened plaster material on its second surface along a line adjacent to and substantially parallel to a first structurally weakened region of the first liner; and
- snapping the plaster board across the scored line, the snapping being performed such that the first liner is separated along the first substantially linear structurally weakened region thereof.

* * * * *